US008986148B2

(12) United States Patent
Downs et al.

(10) Patent No.: US 8,986,148 B2
(45) Date of Patent: Mar. 24, 2015

(54) SINGLE SPEED AND TWO-SPEED DISCONNECTING AXLE ARRANGEMENTS

(71) Applicant: American Axle & Manufacturing, Inc., Detroit, MI (US)

(72) Inventors: James Preston Downs, South Lyon, MI (US); Paul Joseph Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/239,756

(22) PCT Filed: Oct. 3, 2013

(86) PCT No.: PCT/US2013/063219
§ 371 (c)(1),
(2) Date: Feb. 19, 2014

(87) PCT Pub. No.: WO2014/055733
PCT Pub. Date: Apr. 10, 2014

(65) Prior Publication Data
US 2015/0011349 A1  Jan. 8, 2015

Related U.S. Application Data

(60) Provisional application No. 61/710,007, filed on Oct. 5, 2012.

(51) Int. Cl.
*B60K 17/348* (2006.01)
*B60K 17/354* (2006.01)
(Continued)

(52) U.S. Cl.
CPC ............... *B60K 17/348* (2013.01); *B60K 17/16* (2013.01); *B60K 17/35* (2013.01)
USPC .......................................... 475/204; 475/221

(58) Field of Classification Search
USPC ......... 475/198, 200, 203, 204, 219, 221, 230, 475/248
See application file for complete search history.

(56) References Cited

U.S. PATENT DOCUMENTS 1,362,361 A    12/1920  Starr
2,783,661 A     3/1957  Dryer
(Continued)

FOREIGN PATENT DOCUMENTS

EP    0865954 A2    9/1998
EP    1466777 A2    10/2004
(Continued)

OTHER PUBLICATIONS

International Search Report and Written Opinion for International Application No. PCT/US2009/053514, dated Mar. 29, 2010.
(Continued)

*Primary Examiner* — Jacob S Scott
(74) *Attorney, Agent, or Firm* — Harness, Dickey & Pierce, P.L.C.

(57) ABSTRACT

A disconnectable driveline arrangement for an all-wheel drive vehicle includes a power take-off unit having a disconnect mechanism, a rear drive module having a torque transfer device providing a disconnect function, a speed synchronization function and a torque biasing function, and a control system for controlling actuation of the disconnect mechanism and the torque transfer device. The power take-off unit and the rear drive module can each be equipped with a two-speed range shift unit which, under the control of the control system, permits establishment of high and low speed drive connections.

20 Claims, 17 Drawing Sheets

(51) Int. Cl.
  *B60K 17/16* (2006.01)
  *B60K 17/35* (2006.01)

(56) References Cited

U.S. PATENT DOCUMENTS

| | | | |
|---|---|---|---|
| 3,749,217 A | 7/1973 | Bush et al. |
| 4,381,828 A | 5/1983 | Lunn et al. |
| 4,407,387 A | 10/1983 | Lindbert |
| 4,763,749 A | 8/1988 | Miura et al. |
| 4,774,857 A | 10/1988 | Heine et al. |
| 4,782,721 A | 11/1988 | Dick |
| 4,875,978 A | 10/1989 | Hiketa |
| 4,915,190 A | 4/1990 | Iwata |
| 4,938,306 A | 7/1990 | Sumiyoshi et al. |
| 5,041,069 A | 8/1991 | Horst |
| 5,061,229 A | 10/1991 | Tsukamoto et al. |
| 5,065,639 A | 11/1991 | Flanhardt et al. |
| 5,069,305 A | 12/1991 | Kobayashi |
| 5,083,986 A | 1/1992 | Teraoka et al. |
| 5,105,901 A | 4/1992 | Watanabe et al. |
| 5,105,902 A | 4/1992 | Wilson et al. |
| 5,156,247 A | 10/1992 | Wiese et al. |
| 5,174,408 A | 12/1992 | Hock |
| 5,188,194 A | 2/1993 | Gasch |
| 5,234,072 A | 8/1993 | Chludek |
| 5,314,039 A | 5/1994 | Hock |
| 5,411,110 A | 5/1995 | Wilson et al. |
| 5,423,235 A | 6/1995 | Botterill et al. |
| 5,484,033 A | 1/1996 | Frank et al. |
| 5,547,430 A | 8/1996 | Gasch |
| 5,562,566 A | 10/1996 | Yang |
| 5,599,249 A | 2/1997 | Zalewski et al. |
| 5,632,185 A | 5/1997 | Gassmann |
| 5,662,543 A | 9/1997 | Forsyth |
| 5,690,201 A | 11/1997 | Gassmann |
| 5,706,923 A | 1/1998 | Gassmann |
| 5,762,578 A | 6/1998 | Forsyth |
| 5,839,986 A | 11/1998 | Yamazaki |
| 5,904,632 A | 5/1999 | Brown et al. |
| 5,935,036 A | 8/1999 | Gassmann et al. |
| 5,951,428 A | 9/1999 | Itoh et al. |
| 5,980,415 A | 11/1999 | Showalter |
| 5,989,146 A | 11/1999 | Brown et al. |
| 6,113,512 A | 9/2000 | Williams |
| 6,116,392 A | 9/2000 | Gassmann |
| 6,142,905 A | 11/2000 | Brown et al. |
| 6,186,258 B1 | 2/2001 | Deutschel et al. |
| 6,209,673 B1 | 4/2001 | Barlage et al. |
| 6,238,317 B1 | 5/2001 | Brown et al. |
| 6,241,067 B1 | 6/2001 | Hock |
| 6,263,995 B1 | 7/2001 | Watson et al. |
| 6,267,214 B1 | 7/2001 | Kwoka |
| 6,431,337 B1 | 8/2002 | Hock et al. |
| 6,443,282 B1 | 9/2002 | Kwoka |
| 6,446,773 B2 | 9/2002 | Kwoka |
| 6,461,267 B1 | 10/2002 | Paielli |
| 6,520,885 B2 | 2/2003 | Gassmann et al. |
| 6,533,090 B2 | 3/2003 | Osborn et al. |
| 6,547,025 B1 | 4/2003 | Gassmann et al. |
| 6,557,677 B2 | 5/2003 | Peura |
| 6,592,487 B2 | 7/2003 | Gassmann |
| 6,769,506 B2 | 8/2004 | Gassmann et al. |
| 6,779,420 B2 | 8/2004 | Peura |
| 6,805,653 B2 | 10/2004 | Krzesicki et al. |
| 6,808,037 B1 | 10/2004 | Mueller |
| 6,814,682 B2 | 11/2004 | Spitale |
| 6,827,663 B2 | 12/2004 | Tucker-Peake |
| 6,849,017 B2 | 2/2005 | Nett |
| 6,851,327 B2 | 2/2005 | Lee |
| 6,851,501 B2 | 2/2005 | Gassmann |
| 6,945,899 B2 | 9/2005 | Peura |
| 6,964,315 B2 | 11/2005 | Mueller |
| 6,974,400 B2 | 12/2005 | Williams |
| 7,094,172 B2 | 8/2006 | Ishikawa |
| 7,150,694 B2 | 12/2006 | Mizon et al. |
| 7,178,652 B2 | 2/2007 | Mueller |
| 7,189,179 B2 | 3/2007 | Williams et al. |
| 7,309,301 B2 | 12/2007 | Janson et al. |
| 7,331,896 B1 | 2/2008 | Kroppe |
| 7,416,505 B2 | 8/2008 | Downs |
| 7,452,301 B2 | 11/2008 | Yoshioka |
| 7,533,754 B2 | 5/2009 | Burrows et al. |
| 8,042,642 B2 | 10/2011 | Marsh et al. |
| 8,047,323 B2 | 11/2011 | Downs et al. |
| 8,215,440 B2 | 7/2012 | Hoffmann et al. |
| 8,469,854 B1 | 6/2013 | Downs et al. |
| 2002/0032096 A1 | 3/2002 | Gassmann |
| 2003/0040394 A1 | 2/2003 | Palazzolo |
| 2003/0089185 A1 | 5/2003 | Hock et al. |
| 2004/0198548 A1 | 10/2004 | Showalter et al. |
| 2005/0023063 A1 | 2/2005 | Mueller |
| 2006/0281597 A1 | 12/2006 | Williams et al. |
| 2006/0283654 A1 | 12/2006 | Krisher |
| 2007/0289797 A1 | 12/2007 | Bowen |
| 2008/0128234 A1 | 6/2008 | Mogami et al. |
| 2008/0227582 A1 | 9/2008 | Peura |
| 2009/0160274 A1 | 6/2009 | Aikawa et al. |
| 2010/0038164 A1 | 2/2010 | Downs et al. |
| 2010/0044138 A1 | 2/2010 | Marsh et al. |
| 2010/0216593 A1 | 8/2010 | Ekonen et al. |
| 2011/0275470 A1 | 11/2011 | Ekonen et al. |
| 2011/0319213 A1 | 12/2011 | Ekonen et al. |
| 2012/0029779 A1 | 2/2012 | Dickinson et al. |
| 2012/0073929 A1 | 3/2012 | Grutter et al. |
| 2012/0083380 A1 | 4/2012 | Reed et al. |
| 2012/0204664 A1 | 8/2012 | Peura et al. |
| 2013/0303326 A1 | 11/2013 | Downs et al. |

FOREIGN PATENT DOCUMENTS

| | | |
|---|---|---|
| KR | 2019990020807 U | 6/1999 |
| KR | 100274035 B1 | 12/2000 |
| KR | 100461078 B1 | 12/2004 |
| KR | 100483163 B1 | 4/2005 |
| KR | 20100078173 A | 7/2010 |
| WO | WO-03-038296 A2 | 5/2003 |
| WO | WO-2010104853 A2 | 9/2010 |

OTHER PUBLICATIONS

International Preliminary Report on Patentability (Chapter I of the Patent Cooperation Treaty) for PCT/US2009/053514, issued Feb. 15, 2011.

International Search Report and Written Opinion for International Application No. PCT/US2010/041767, dated Feb. 28, 2011.

International Search Report and Written Opinion for International Application No. PCT/US2013/063219, ISA/KR, mailed Jan. 8, 2014.

SINGLE SPEED AND TWO-SPEED DISCONNECTING AXLE ARRANGEMENTS

CROSS REFERENCE TO RELATED APPLICATIONS

The present application is a U.S. National Phase application under 35 U.S.C. §371 of International Application No. PCT/US2013/063219, filed on Oct. 3, 2013, which claims priority to U.S. 61/710,007, filed on Oct. 5, 2012.

FIELD

The present disclosure relates generally to all-wheel drive vehicles and more particularly to single-speed and multi-speed disconnectable drivelines for all-wheel drive vehicles.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction when the vehicle is operated in inclement weather and on off-highway road conditions. Such AWD vehicles necessarily are equipped with a much more complex drivetrain which, in addition to the primary driveline, must include the additional components associated with the secondary driveline such as a power take-off unit and a propshaft.

In an effort to minimize driveline losses (i.e., viscous drag, friction, inertia and oil churning) associated with secondary driveline being back-driven when no drive torque is transmitted thereto, it is known to incorporate a disconnect system that is configured to uncouple components of the secondary driveline such as, for example, the rear wheels or the rear differential from the remainder of the secondary driveline. To this end, there remains a need in the art for development of improved disconnectable drivelines for use in AWD vehicles.

SUMMARY

It is an aspect of the present teachings to provide a disconnectable secondary driveline arrangement for use with all-wheel drive vehicles that includes a single-speed power take-off unit having a disconnect mechanism, a single-speed rear drive module having a torque transfer device capable of providing a disconnect function, a speed synchronizing function and a torque biasing function, and a control system for controlling actuation of the disconnect mechanism and the torque transfer device.

It is another aspect of the present teachings to provide a disconnectable secondary driveline arrangement for use with all-wheel drive vehicles that includes a two-speed power take-off unit having a disconnect mechanism and range shift mechanism, a two-speed rear drive module having a torque transfer device and a range shift mechanism, and a control system for controlling coordinated actuation of the two-speed power take-off unit and the two-speed rear drive module.

In accordance with these and other aspects of the present teachings, an all-wheel drive vehicle can include a powertrain, a primary driveline, a power switching mechanism, a secondary driveline, and a control system. The powertrain can include a prime mover and a transmission having an output. The primary driveline is driven by the transmission output and is operable to direct rotary power from the prime mover to a pair of first vehicle wheels. The power switching mechanism is operable under the control of the control system in one of a disconnected mode and a connected mode. The power switching mechanism is operable in its connected mode to direct rotary power from the transmission output to the secondary driveline. The secondary driveline can include a rear drive module and a propshaft that couples an output of the power switching mechanism to an input of the rear drive module. The rear drive module can include a secondary differential interconnecting a pair of axle shafts to a pair of second vehicle wheels, and a torque transfer device operably disposed between the input and the secondary differential. The torque transfer device is operable under the control of the control system in one of a disconnected mode and a connected mode. The torque transfer device is operable in its connected mode to direct rotary power transmitted by the power switching mechanism to the secondary differential. When the power switching mechanism and the torque transfer device are in their disconnected modes, rotary power is only transmitted to the first vehicle wheels. The torque transfer device is operable in its disconnected mode to prevent the second vehicle wheels and the secondary differential from back-driving the input of the rear drive module, the propshaft, and the output of the power switching mechanism. The power switching mechanism is operable in its disconnected mode to prevent the transmission output from driving the output of the power switching mechanism and the propshaft.

In addition to the above, an all-wheel drive vehicle of the present teachings can also include a two-speed power switching mechanism and a two-speed rear drive module. The two-speed power switching mechanism is still operable in a disconnected mode and a connected mode but further includes a two-speed range unit that is operably disposed between the transmission output and a primary differential that drives the first vehicle wheels. The power switching mechanism is capable of establishing a two-wheel high-range drive connection, a four-wheel high-range drive connection, and a four-wheel low-range drive connection between the transmission output and the primary differential. The two-speed rear drive module is still operable in its disconnected and connected modes but further includes a two-speed range unit that is operably disposed between an output of the torque transfer device and the secondary differential. The rear drive module is capable of establishing a high range drive connection and a low-range drive connection between the output of the torque transfer device and an input to the secondary differential. The control system is operable to coordinate actuation of the two-speed power switching mechanism and the two-speed rear drive module.

Further areas of applicability will become apparent from the description and claims herein. The description and specific examples in this summary are intended for purposes of illustration only and are not intended to limit the scope of the present disclosure.

DRAWINGS

The drawings described herein are for illustrative purposes only of selected embodiments and are not intended to limit the scope of the present disclosure in any way. Similar or identical elements are given consistent reference numerals throughout the various figures.

The present disclosure will become more fully understood from the detailed description and the accompanying drawings wherein.

DETAILED DESCRIPTION

The following exemplary embodiments are provided so that the present disclosure will be thorough and fully convey the scope to those skilled in the art. Numerous specific details are set forth such as examples of specific components, devices and schematic configurations to provide a thorough understanding of exemplary embodiments of the present disclosure. However, it will be apparent to those skilled in the art that these specific details need not be employed, that the exemplary embodiments may be embodied in many different forms, and that neither should be construed to limit the scope of the present disclosure.

Figure 1:
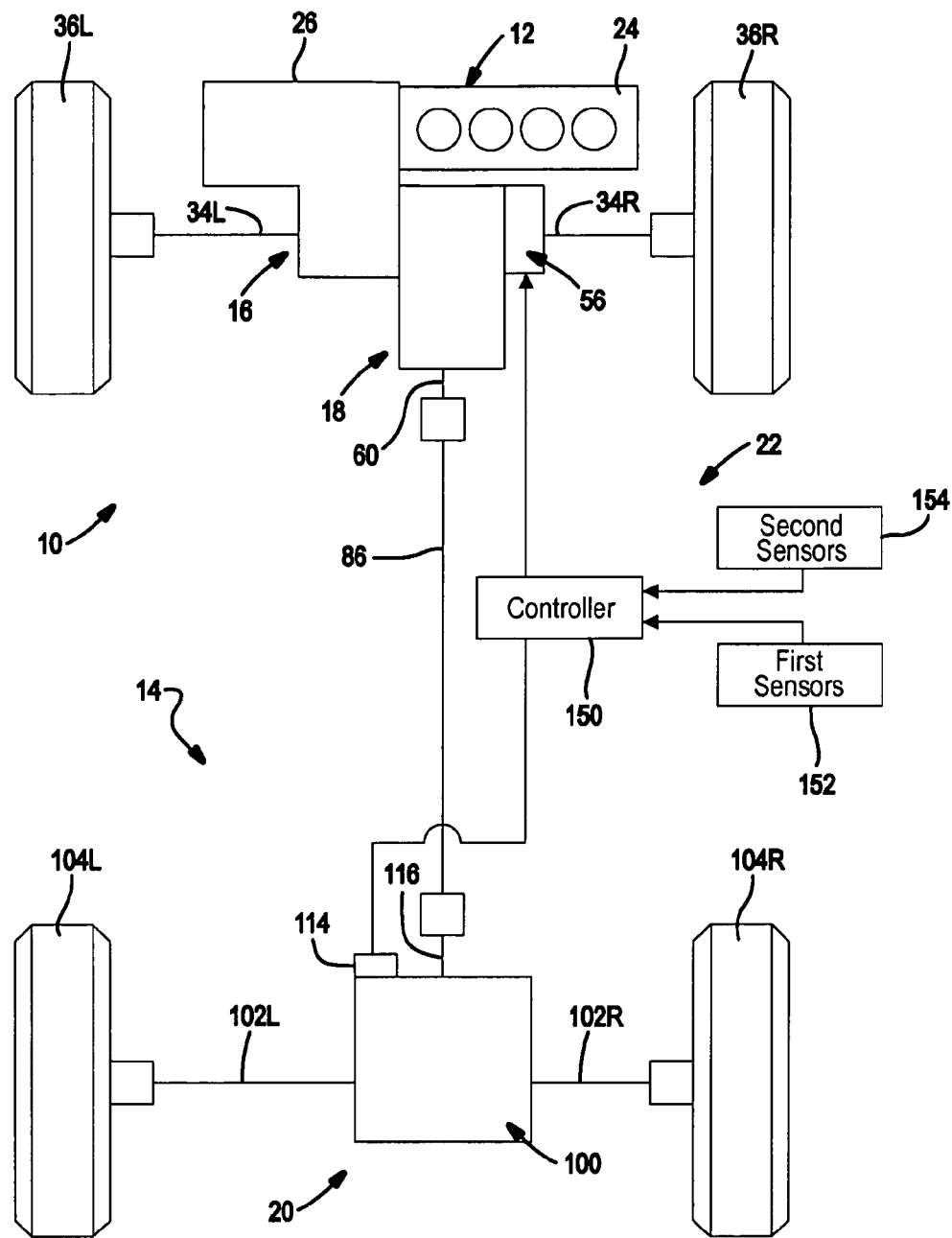
FIG. 1 is a schematic of a motor vehicle equipped with a disconnectable all-wheel drive system constructed in accordance with the present teachings.

With reference to FIG. 1 of the drawings, a motor vehicle constructed in accordance with the teachings of the present disclosure is schematically shown and generally indicated by reference numeral 10. The vehicle 10 can include a powertrain 12 and a drivetrain 14 that can include a primary driveline 16, a power switching mechanism 18, a secondary driveline 20, and a control system 22. In the various aspects of the present teachings, the primary driveline 16 can be a front driveline while the secondary driveline 20 can be a rear driveline.

The powertrain 12 can include a prime mover 24, such as an internal combustion engine or an electric motor, and a transmission 26 which can be any type of ratio-changing mechanism, such as a manual, automatic, or continuously variable transmission. The prime mover 24 is operable to provide rotary power to the primary driveline 16 and the power transfer mechanism 18.

Figure 2:
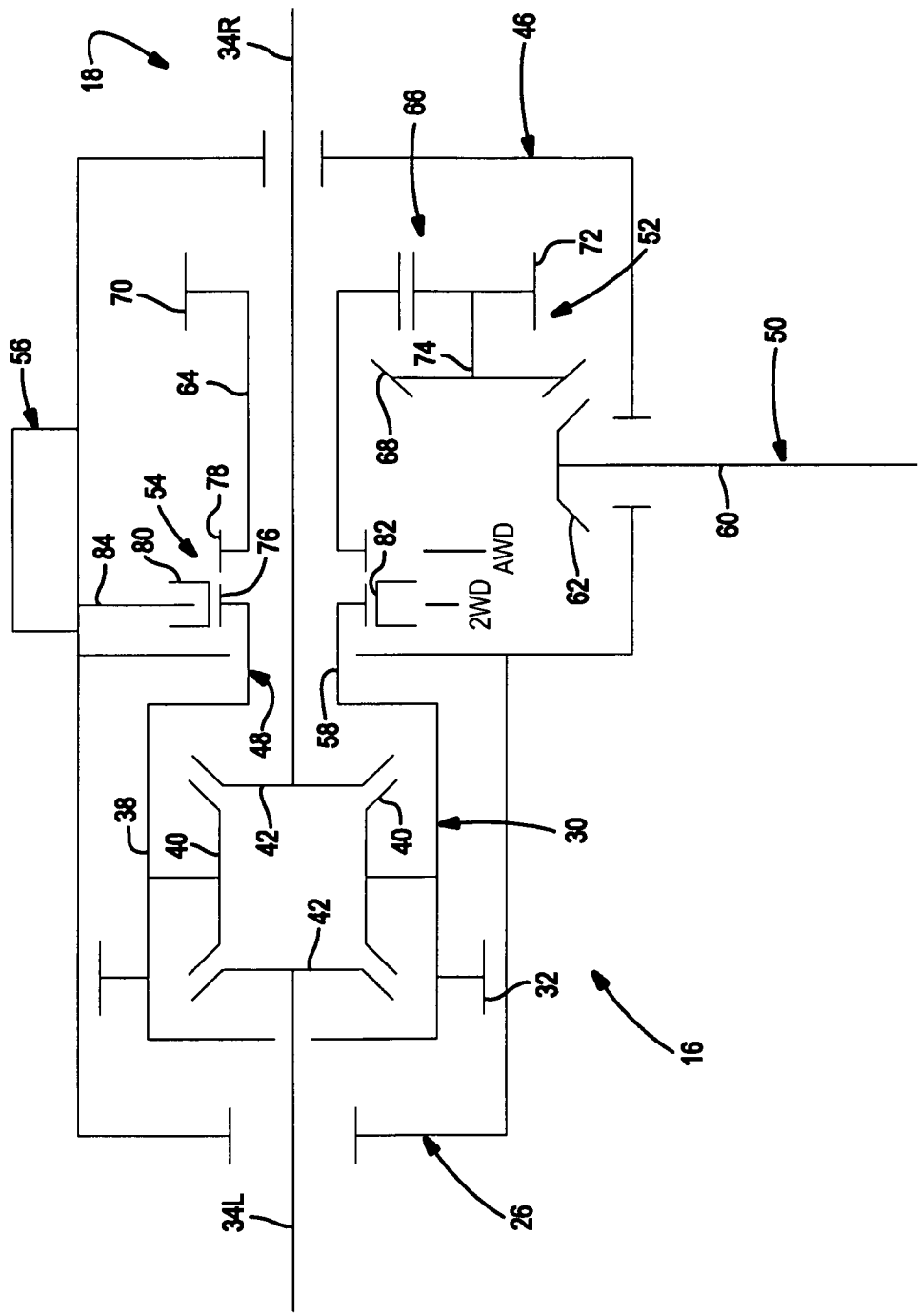
FIG. 2 is a schematic illustration of a single-speed power take-off unit associated with the disconnectable all-wheel drive system of FIG. 1.
Figure 3:
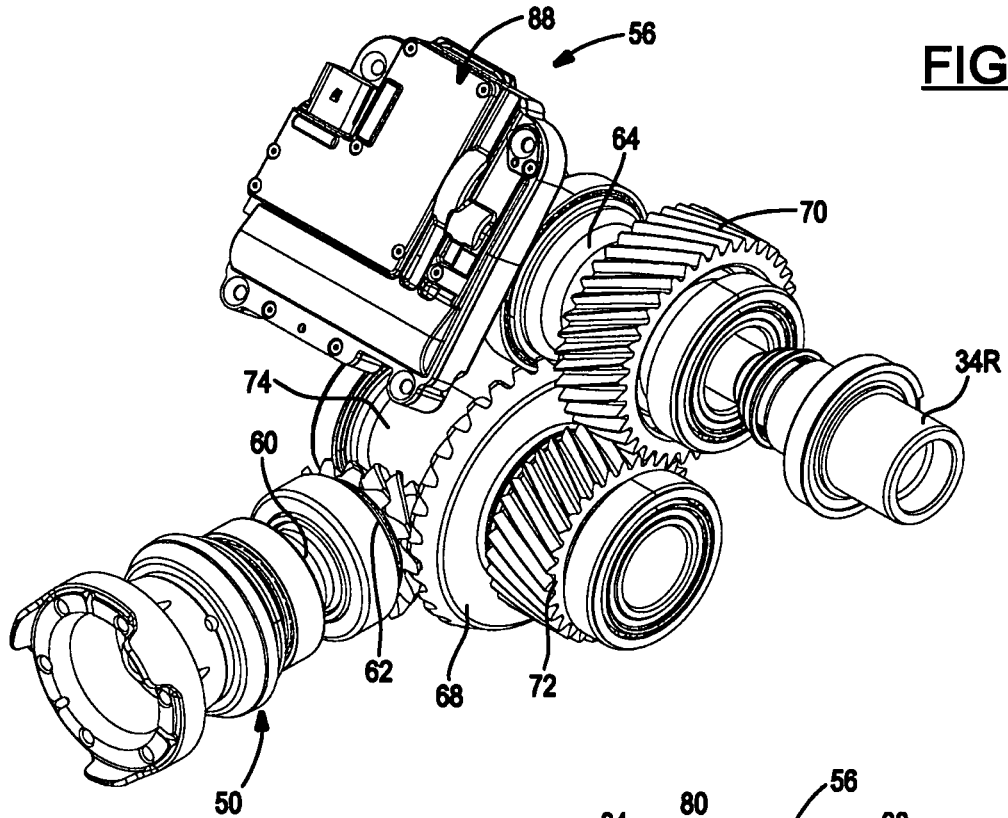
FIG. 3 through FIG. 5 are perspective views of a single-speed power take-off unit based on the schematic shown in FIG. 2 with its housing structure removed for improved clarity and which is constructed in accordance with the present teachings.
Figure 4:
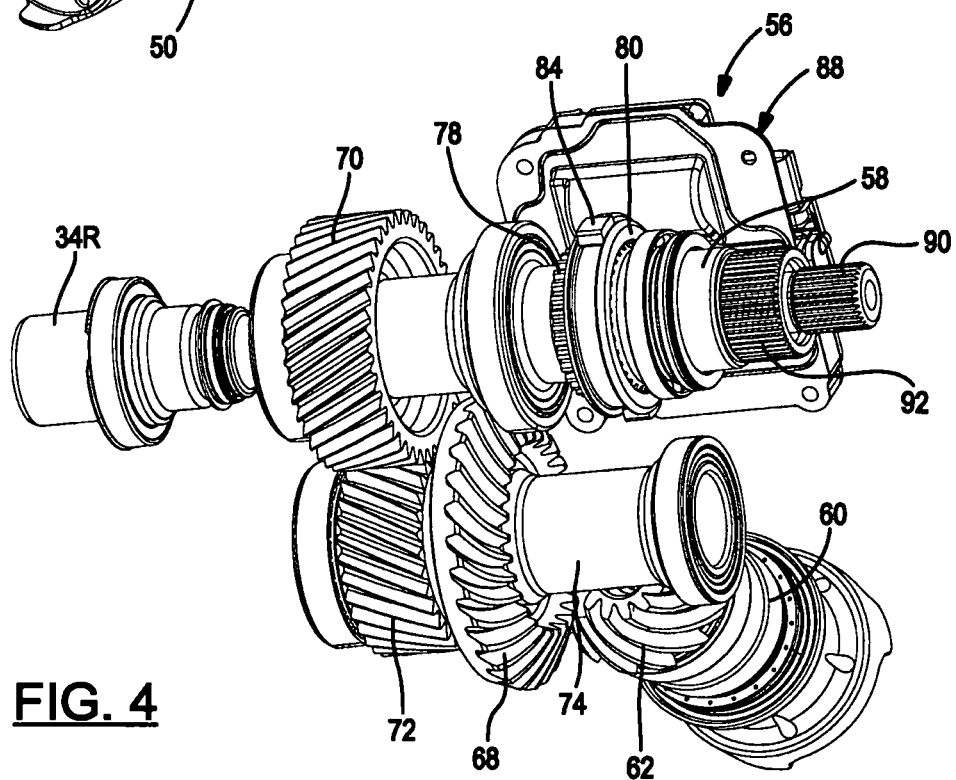
Figure 5:
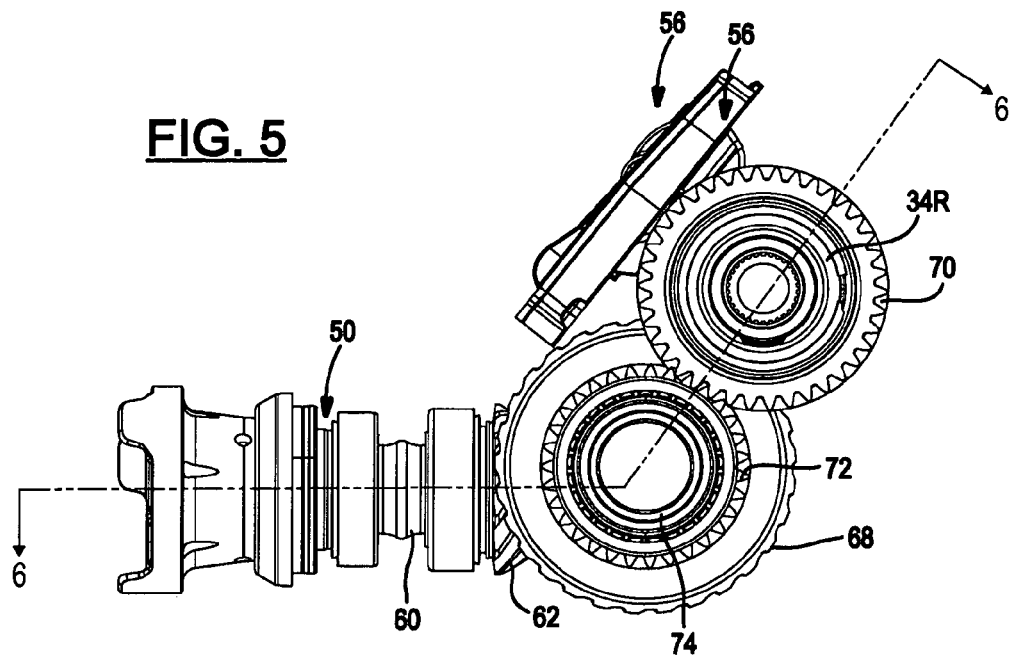
Figure 6:
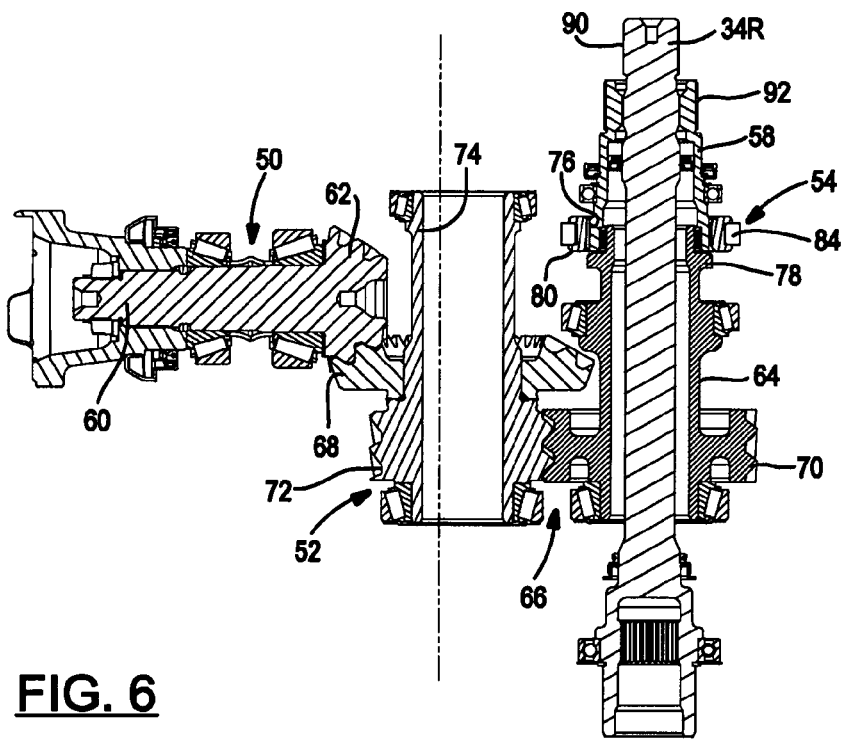
FIG. 6 is a sectional view of the single-speed power take-off unit taken generally along line 6-6 of FIG. 5.

With additional reference to FIG. 2, the primary driveline 16 can include a primary or first differential 30 having an input member 32 driven by an output member (not shown) of the transmission 26. In the particular construction shown, the first differential 30 is configured as part of the transmission 26, a type commonly referred to as a transaxle and typically used in front-wheel drive vehicles. The primary driveline 16 can further include a pair of first axle shafts 34L, 34R that can couple output components of the first differential 30 to a set of first vehicle wheels 36L, 36R. The first differential 30 can include a first differential case 38 that is rotatably driven by the input member 32, at least one pair of first pinion gears 40 rotatably driven by the first differential case 38, and a pair of first output side gears 42 meshed with the first pinion gears 40 and which are connected to drive the first axle shafts 34L, 34R.

With continued reference to FIG. 2, the power switching mechanism 18, hereinafter referred to as a power take-off unit (PTU), can generally include a housing 46, an input 48 coupled for common rotation with the first differential case 38 of the first differential 30, an output 50, a transfer gear assembly 52, a disconnect mechanism 54, and a disconnect actuator 56. The input 48 can include a tubular input shaft 58 rotatably supported by the housing 46 and which concentrically surrounds a portion of the first axle shaft 34R. A first end of the input shaft 58 can be coupled for rotation with the first differential case 38. The output 50 can include an output pinion shaft 60 rotatably supported by the housing 46 and having a pinion gear 62. The transfer gear assembly 52 can include a hollow transfer shaft 64, a helical gearset 66, and a hypoid gear 68 that is meshed with the pinion gear 62. The transfer shaft 64 concentrically surrounds a portion of the first axle shaft 34R and is rotatably supported by the housing 46. The helical gearset 66 can include a first helical gear 70 fixed for rotation with the transfer shaft 64 and a second helical gear 72 which is meshed with the first helical gear 70. The second helical gear 72 and the hypoid gear 68 are integrally formed on, or fixed for common rotation with, a stub shaft 74 that is rotatably supported in the housing 46.

The disconnect mechanism 54 can comprise any type of clutch, disconnect or coupling device that can be employed to selectively transmit rotary power from the powertrain 14 to the secondary driveline 20. In the particular example provided, the disconnect mechanism 54 is configured as a dog clutch. The dog clutch can include a set of external spline teeth 76 formed on a second end of the input shaft 58, a set of external clutch teeth 78 formed on the transfer shaft 64, a mode collar 80 having internal spline teeth 82 constantly meshed with the external spline teeth 76 on the input shaft 58, and a shift fork 84 operable to axially translate the shift collar 80 between a first mode position and a second mode position. While schematically shown as a non-synchronized dog clutch, it will be understood that the disconnect mechanism 54 can include a synchronized dog clutch if such a configuration is desired.

The mode collar 80 is shown in its first mode position, identified by a "2WD" leadline, wherein the internal spline teeth 82 on the mode collar 80 are disengaged from the external clutch teeth 78 on the transfer shaft 64. As such, the input shaft 58 is disconnected from driven engagement with the transfer shaft 64. Thus, no rotary power is transmitted from the powertrain 12 to the transfer gear assembly 52 and the output pinion shaft 60 of the power take-off unit 18. With the mode collar 80 in its second mode position, identified by an "AWD" leadline, its internal spline teeth 82 are engaged with both the external spline teeth 76 on the input shaft 58 and the external clutch teeth 78 on the transfer shaft 64. Accordingly, the mode collar 80 establishes a drive connection between the input shaft 58 and the transfer shaft 64 such that rotary power from the powertrain 12 is transmitted through the power take-off unit 18 to the output pinion shaft 60. As will be detailed, the output pinion shaft 60 is coupled via a propshaft 86 to the secondary driveline 20.

The disconnect actuator 56 can be any type of actuator mechanism that is operable for axially moving the shift fork 84 which, in turn, causes concurrent axial translation of the mode collar 80 between its two distinct mode positions. The disconnect actuator 56 is shown mounted to the housing 46 of the power take-off unit 18. The disconnect actuator 56 can be a power-operated mechanism that can receive control signals from the control system 22 and can include, for example, hydraulically-actuated, pneumatically-actuated or electromechanically-actuated arrangements.

As noted, FIG. 2 schematically illustrates the components that can be associated with the power take-off unit 18. Reference now to FIG. 3 through 6 will provide a more definitive structural configuration of such components that are associated with an exemplary embodiment of the power take-off unit 18. In particular, these drawings illustrate the components in an assembled condition with the housing 46 removed for improved clarity. Each of the input shaft 58, the transfer shaft 64, the stub shaft 74, and the output pinion shaft 60 are shown with suitable bearings assembled thereon for rotatably supporting each within or from the housing 46. The disconnect actuator 56 is shown as a self-contained power-operated unit 88 from which the shift fork 84 extends. The power-operated unit 88 can include an electric motor and a geared drive unit configured to convert rotation of the motor output into translational movement of the shift fork 84. External spline teeth 90 are provided on one end of the first axle shaft 34R for facilitating a splined connection with its respective first side gear 42 in the first differential 30. Likewise, external spline teeth 92 are provided on the first end of the input shaft 58 for facilitating a splined connection with a mating portion of the first differential case 38.

Figure 7:
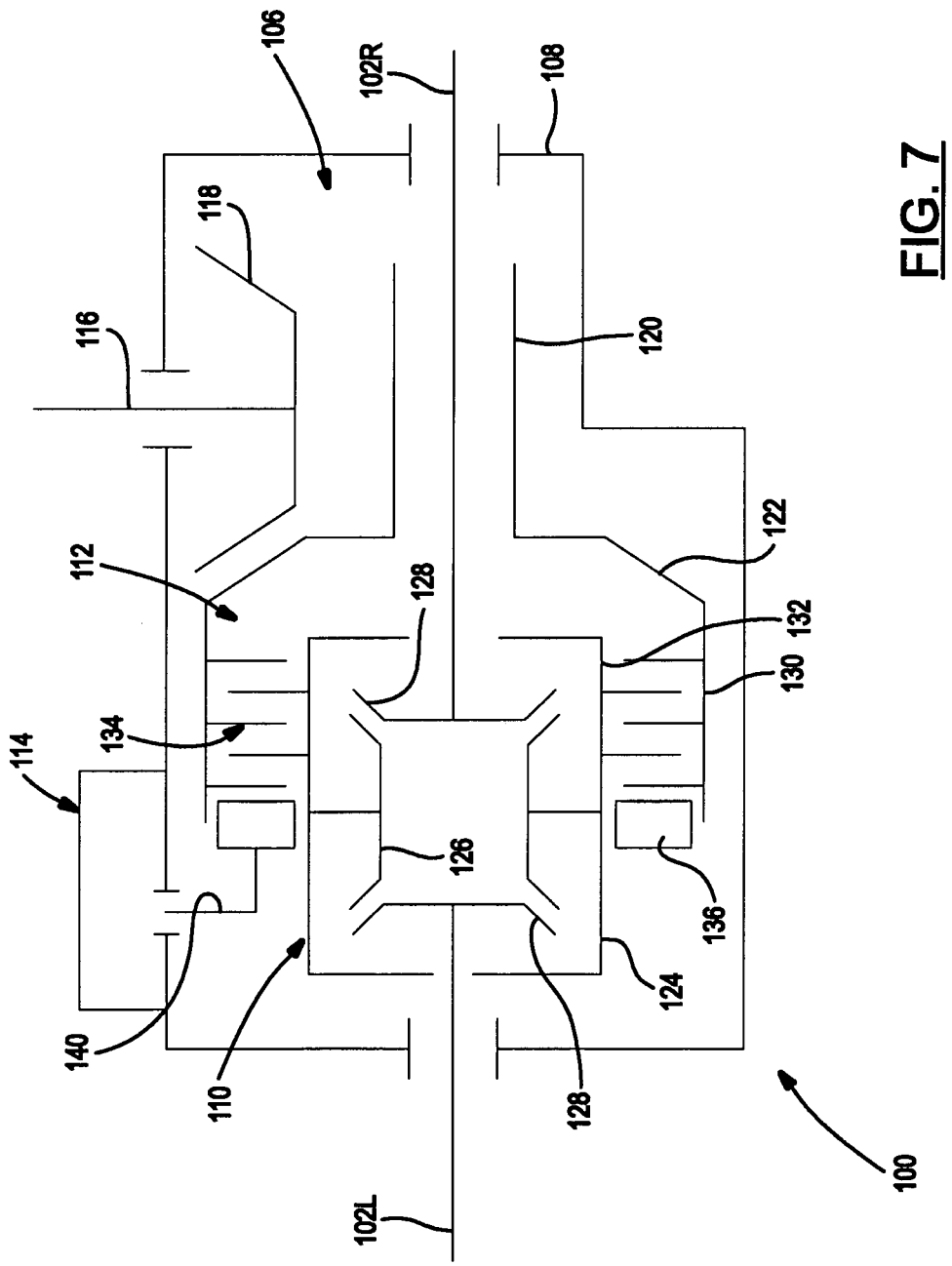
FIG. 7 is a schematic illustration of a single-speed rear drive module associated with the disconnectable all-wheel drive system of FIG. 1.

With particular reference now to FIGS. 1 and 7, the secondary driveline 20 can include the propshaft 86, a rear drive module (RDM) 100, a pair of second axle shafts 102L, 102R, and a pair of second vehicle wheels 104L, 104R. A first end of the propshaft 86 can be coupled for rotation with the output pinion shaft 60 extending from the power take-off unit 18 while a second end of the propshaft 86 can be coupled for rotation with an input assembly 106 of the rear drive module 100. The rear drive module 100 can include a housing 108, a secondary or second differential 110, a torque transfer device (TTD) 112 that is generally configured and arranged to selectively couple and transmit rotary power from the input assembly 106 to the second differential 110, and a TTD actuator 114. The input assembly 106 can include an input pinion shaft 116 having a pinion gear 118, a hollow spool 120, and a hypoid gear 122 fixed for rotation with the spool 120 and which is meshed with the pinion gear 118. The second differential 110 can include an input member such as a second differential case 124, at least one pair of second pinion gears 126 rotatably driven by the second differential case 124, and a pair of output members such as second output side gears 128 that are meshed with the second pinion gears 126. The second output side gears 128 are fixed for rotation with the inboard ends of the second axle shafts 102L, 102R. The second differential 110 and the torque transfer device 112 are shown disposed on one side of the input pinion shaft 116 to provide a compact arrangement.

The torque transfer device 112 can include any type of clutch or coupling device that can be employed to selectively transmit rotary power from the input assembly 106 to the second differential 110. In the example shown, the torque transfer device 112 is a multi-plate friction clutch that can include an input clutch member 130 driven by the hypoid gear 122, an output clutch member 132 coupled for rotation with the second differential case 124, a multi-plate clutch pack 134 having a plurality of interleaved friction plates disposed between the input and output clutch members, and an engagement member 136 that is moveable for selectively applying a clutch engagement force to the clutch pack 134. The torque transfer device 112 is shown to generally surround a portion of the second differential 110. The TTD actuator 114 is provided to generate translational movement of the engagement member 136 relative to the clutch pack 134 and can be controlled by control signals from the control system 22.

A first or "disconnected" mode can be established for the torque transfer device 112 when the engagement member 136 is positioned such that rotary power is not transmitted from the input clutch member 130 to the output clutch member 132. In this "disconnected" mode, the second vehicle wheels 104L, 104R, the second axle shafts 102L, 102R, the second differential 110, and the output clutch member 132 are disconnected from the input 106 of the rear drive module 100. As such, rotation of these components as a result of rolling motion of the second vehicle wheels 104L, 104R does not "back-drive" input pinion shaft 116, the propshaft 86 and components of the power take-off unit 18.

A second or "connected" mode for the torque transfer device 112 can be established when the clutch engagement force exerted by the engagement member 136 on the clutch pack 134 causes rotary power to be transmitted from the input 106 to the second differential case 124 for delivery to the second vehicle wheels 104L, 104R through the second differential 110. In addition, a "torque biasing" function can also be provided in the connected mode since variable control over the magnitude of the clutch engagement force applied to the clutch pack 134 can vary the distribution ratio of the rotary power transmitted from the powertrain 12 to the primary driveline 16 and the secondary driveline 20. Thus, the torque transfer device 112 can be configured or controlled to slip or cyclically engage and disengage as appropriate for biasing the available drive torque while establishing the drive connection between the input 106 and the second differential 110.

The TTD actuator 114 can be any power-operated device capable of shifting the torque transfer device 112 between its first and second modes as well as adaptively regulating the magnitude of the clutch engagement force exerted by the engagement member 136 on the clutch pack 134. Thus, the TTD actuator 114 can, for example, include an electromagnetic or motor-driven ballscrew, ballramp or other cam actuation system having a mechanical connection, shown by lead line 140, with the engagement member 136. Alternatively, the TTD actuator 114 can include a hydraulic actuation system capable of regulating the position of the engagement member 136 relative to the clutch pack 134 by regulating fluid pressure, also indicated by lead line 140, that is delivered to a pressure chamber.

The control system 22 is schematically shown in FIG. 1 to include a controller 150, a group of first sensors 152, and a group of second sensors 154. The group of first sensors 152 can be arranged within the motor vehicle 10 to sense a vehicle parameter and responsively generate a first sensor signal. The vehicle parameter can be associated with any combination of the following: vehicle speed, yaw rate, steering angle, engine torque, wheel speeds, shaft speeds, lateral acceleration, longitudinal acceleration, throttle position and gear position without limitations thereto. The group of second sensors 154 can be configured to sense a driver-initiated input to one or more on-board devices and/or systems within the vehicle 10 and responsively generate a second sensor signal. For example, the motor vehicle 10 may be equipped with a sensor associated with a mode selection device, such as a switch associated with a push button or a lever, that senses when the vehicle operator has selected between vehicle operation in a two-wheel drive (FWD) mode and an all-wheel drive (AWD) mode. Also, switched actuation of vehicular systems such as the windshield wipers, the defroster, and/or the heating system, for example, may be used by the controller 150 to assess whether the motor vehicle 10 should be shifted automatically between the FWD and AWD modes.

Figure 8:
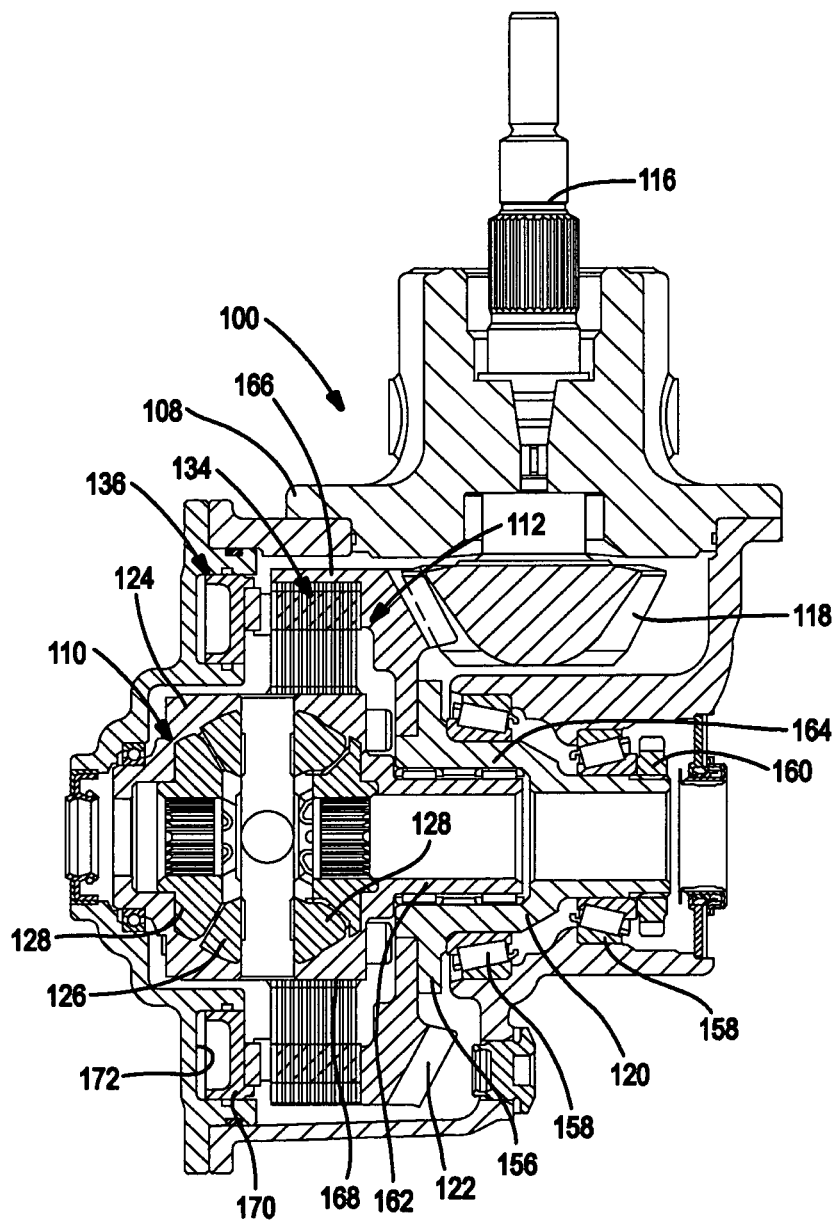
FIG. 8 is a sectional view of a single-speed rear drive module based on the schematic shown in FIG. 7 and which is constructed in accordance with the present teachings.

As noted, FIG. 7 schematically illustrates the components that can be associated with the rear drive module 100. Referring now to FIG. 8, a more definitive structural configuration of such components associated with an exemplary embodiment of the rear drive module 100 is shown. Specifically, the hypoid gear 122 can be fixed to a radial flange portion 156 of the bell-shaped spool 120 which, in turn, is rotatably supported from the housing 108 by a pair of laterally-spaced bearing assemblies 158. A threaded nut 160 is installed on a threaded portion of the spool 120 and can be axially adjusted for varying the preload applied to the bearing assemblies 158. The second differential case 124 has a hub extension 162 that can be rotatably supported within an enlarged bell portion 164 of the spool 120. The input clutch member 130 can be operably associated with the hypoid gear 122 and can include a cylindrical clutch drum 166 that is fixed to or integrally formed with the hypoid gear 122. The output clutch member 132 can be associated with the second differential case 124 and can include a clutch hub 168 that is fixed to or integrally formed on an outer surface of the second differential case 124. A set of inner clutch plates of the clutch pack 134 can be splined to the clutch hub 168 while a set of outer clutch plates can be splined to the clutch drum 166. As noted, the torque transfer device 112 is configured to surround a portion of the second differential 110 to provide a compact arrangement. The engagement member 136 can include an apply piston 170 assembly operably disposed for sliding movement in a pressure chamber 172 and which can be supplied with pressurized fluid by a hydraulically-operated unit associated with TTD actuator 114.

Figure 9:
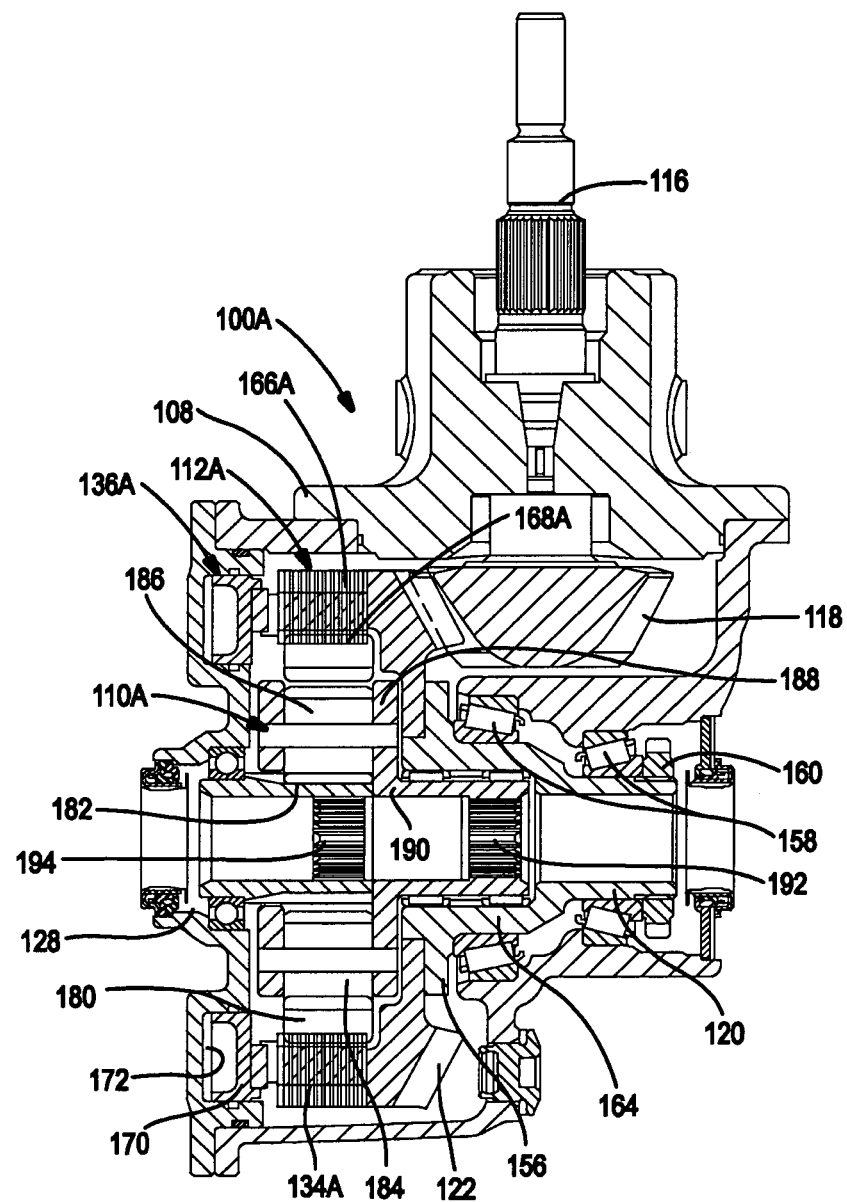
FIG. 9 is a sectional view of another single-speed rear drive module constructed in accordance with the present teachings and which can also be associated with the disconnectable all-wheel drive system of FIG. 1.

Referring to FIG. 9, an alternative exemplary embodiment for the rear drive module 100 is shown and identified by reference numeral 100A. The rear drive module 100A is generally similar to rear drive module 100 but is equipped with an epicyclic-type second differential 110A in place of the bevel-type second differential 110 shown in FIGS. 7 and 8. The epicyclic second differential 110A can include an annulus gear 180, a sun gear 182, a set of first planet gears 184, a set of the second planet gears 186, and a carrier unit 188 from which the first planet gears 184 and second planet gears 186 are rotatably supported. The first planet gears 184 can be meshed with the annulus gear 180 while the second planet gears 186 can be meshed with the sun gear 182. The first and second planet gears are circumferentially arranged such that each one of the first planet gears 184 also meshes with at least one of the second planet gears 186. The annulus gear 180 acts as the input member for the second differential 110A while the carrier unit 188 and the sun gear 182 act as the pair of output members. The carrier unit 188 can include a tubular boss 190 that is rotatably supported within the bell portion 164 of the spool 120 and which has a set of internal splines 192 configured to mate with a set of external splines (not shown) formed on an inboard end of the second axle shaft 102R. Likewise, the sun gear 182 can have a set of internal splines 194 configured to mate with a set of external splines (not shown) formed on an inboard end of the second axle shaft 102L.

The torque transfer device 112A associated with the second differential 110A can include a clutch drum 166A fixed for rotation with the hypoid gear 122, a clutch hub 168A fixed for rotation with the annulus gear 180, a clutch pack 134A operably disposed therebetween, and a clutch engagement member 136A operable to exert a clutch engagement force on the clutch pack 134A in response to control signals transmitted by the control system 22 to the TTD actuator 114. Thus, any rotary power transmitted by the input 106 through the clutch pack 134A will drive the annulus gear 180 and be transmitted to the second axle shafts 102L, 102R through the sun gear 182 and the carrier unit 186, respectively, while the meshed pairs of the first planet gears 184 and the second planet gears 186 facilitate speed differentiation between the second vehicle wheels 104L, 104R.

With reference to FIGS. 1, 2 and 7, the vehicle 10 can normally be operated in the two-wheel drive (FWD) mode in which the power take-off unit 18 and the rear drive module 100 are both disengaged. Specifically, the mode collar 80 of the disconnect mechanism 54 is positioned by the disconnect actuator 56 in its first mode position such that the input shaft 58 is uncoupled from the transfer shaft 64. As such, substantially all power provided by the powertrain 12 is transmitted to the primary driveline 16. Likewise, the torque transfer device 112 can be shifted into and maintained in its first mode such that the input 106, the propshaft 86, the output pinion shaft 60 and the transfer gear assembly 52 within the power take-off unit 18 are not back-driven due to rolling movement of the second vehicle wheels 104.

When it is desired or necessary to operate the motor vehicle 10 in the all-wheel drive (AWD) mode, the control system 22 can be activated via a suitable input which, as noted, can include a drive requested input (via the mode select device) and/or an input generated by the controller 150 in response to signals from the first sensors 152 and/or the second sensors 154. The controller 150 initially signals the TTD actuator 114 to shift the torque transfer device 112 into its second mode. Specifically, the controller 150 controls operation of the TTD actuator 114 such that the actuation member 136 is moved and a clutch engagement force is exerted on the clutch pack 134 that is sufficient to synchronize the speed of the secondary driveline 20 with the speed of the primary driveline 16. Upon speed synchronization, the controller 150 signals the disconnect actuator 56 to cause the mode collar 80 in the power take-off unit 18 to move from its first mode position into its second mode position. With the mode collar 80 in its second mode position, rotary power is transmitted from the powertrain 12 to the primary driveline 16 and the secondary driveline 20. It will be appreciated that subsequent control of the magnitude of the clutch engagement force generated by the torque transfer device 112 permits torque biasing across the clutch pack 134 for controlling the torque distribution ratio transmitted from the powertrain 12 to the primary driveline 16 and the secondary driveline 20.

Figure 10:
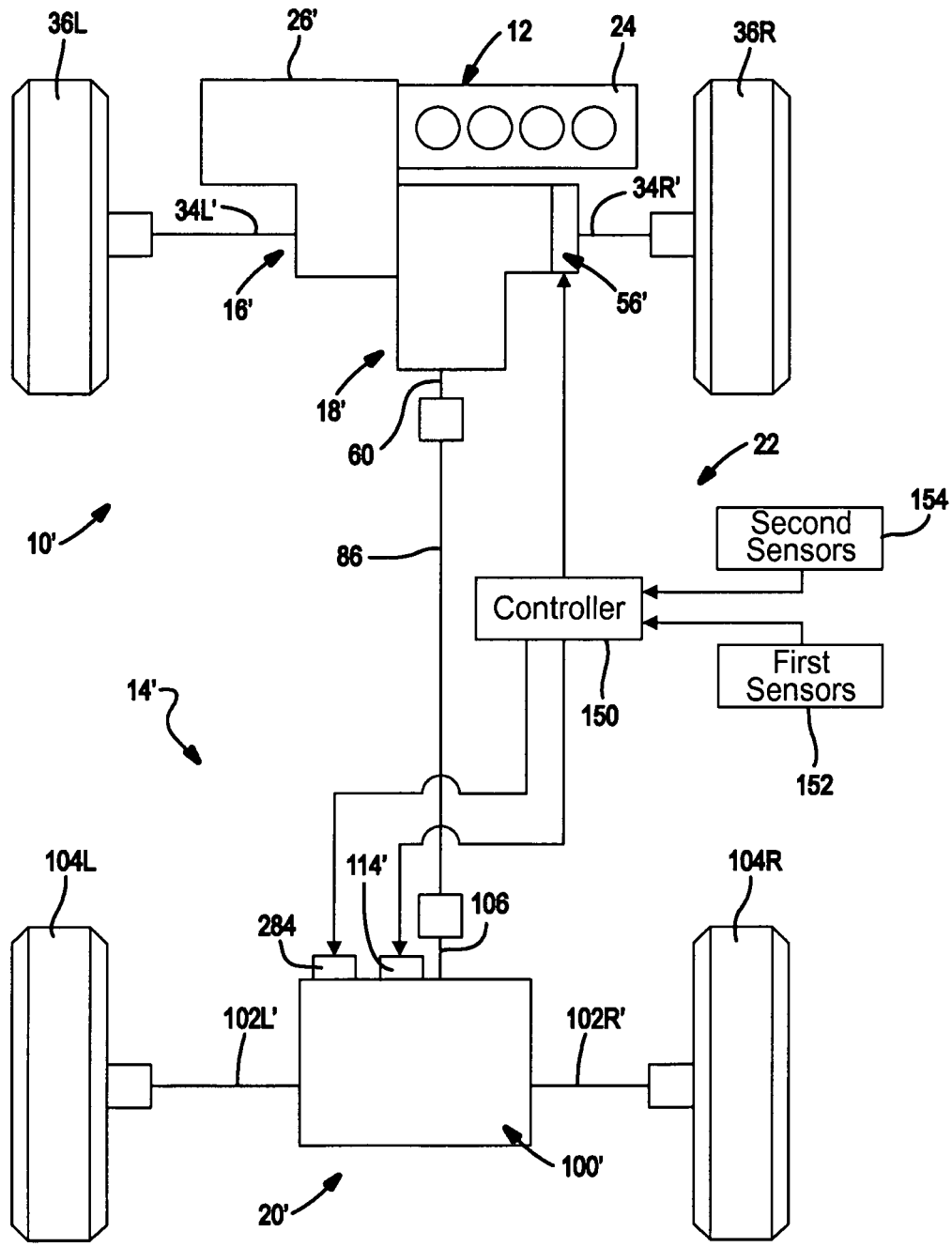
FIG. 10 is a schematic of a motor vehicle equipped with another configuration of a disconnectable all-wheel drive system constructed in accordance with the present teachings.

With reference to FIG. 10, another motor vehicle constructed in accordance with the present teachings is generally indicated by reference numeral 10'. The vehicle 10' is generally similar to the vehicle 10 of FIG. 1 except that the primary driveline 16' and the secondary driveline 20' associated with drivetrain 14' have been modified to incorporate a two-speed range unit into both the power take-off unit 18' and the rear drive module 100'. As will be detailed, this alternative drivetrain arrangement for the vehicle 10' permits establishment of at least one all-wheel low range drive mode in addition to the two-wheel high-range drive mode and the all-wheel high-range drive mode associated with vehicle 10. For purposes of clarity, primed reference numeral are used to designate components that are generally similar in structure and/or function to the non-primed components previously described in relation to FIGS. 1 through 9.

Figure 11:
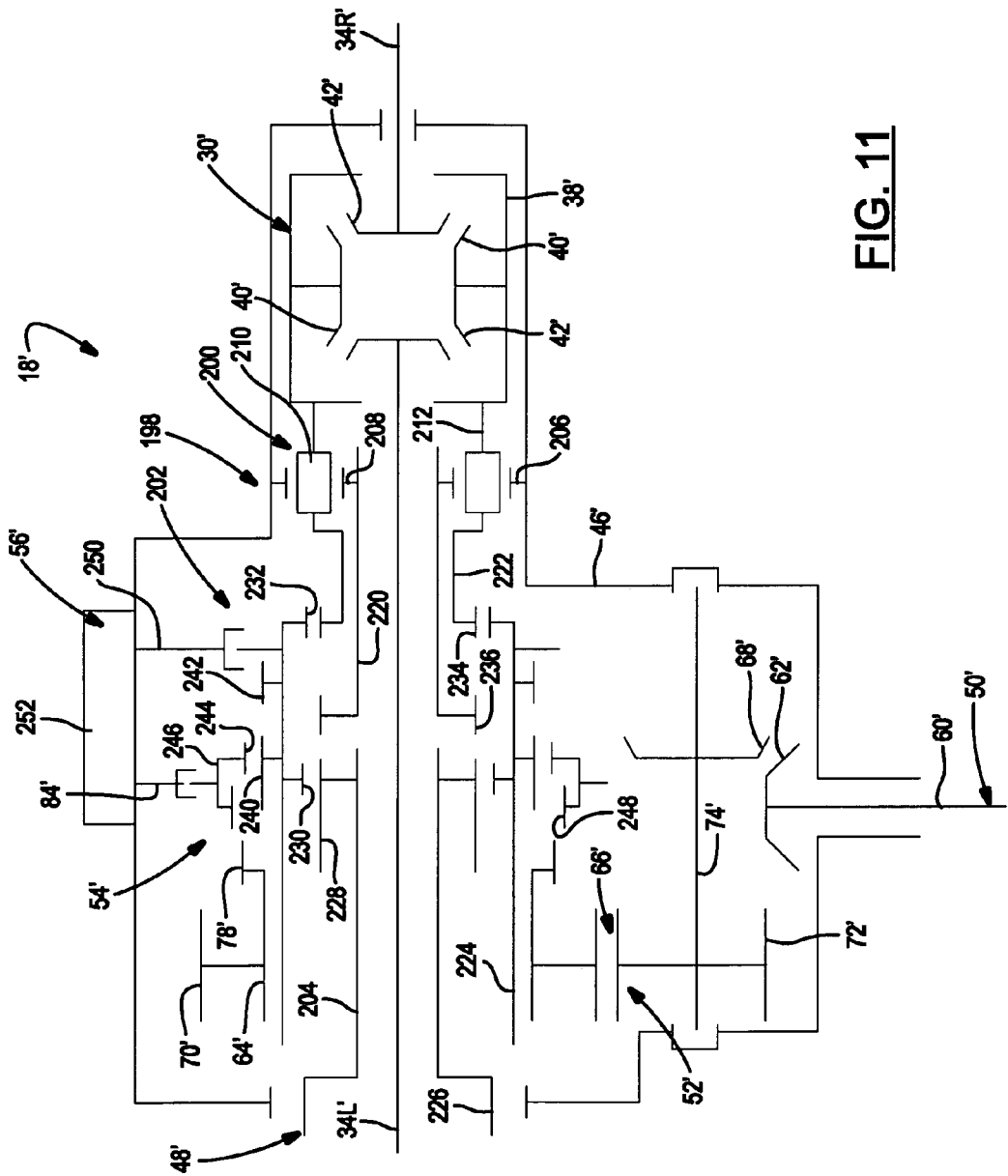
FIG. 11 is a schematic illustration of a two-speed power take-off unit associated with the disconnectable all-wheel drive system of FIG. 10.

With additional reference now to FIG. 11, the power take-off unit 18' is generally shown to include a housing 46', an input 48' adapted for connection to an output member of the transmission 26', an output 50', a transfer gear assembly 52', a first differential 30', a disconnect mechanism 54', a two-speed range unit 198, and a disconnect actuator 56'. The input 48' can include a hollow input shaft 204 rotatably supported by the housing 46' and surrounding the first axle shaft 34L'. The output 50' can include an output pinion shaft 60' having a pinion gear 62'. The transfer gear assembly 52' can include a hollow transfer shaft 64', a helical gearset 66', and a hypoid gear 68' meshed with the pinion gear 62'. The helical gearset 66' can include a first helical gear 70' fixed for rotation with the transfer shaft 64' and a second helical gear 72' that is meshed with the first helical gear 70'. The second helical gear 72' and the hypoid gear 68' are integral with or fixed to a stub shaft 74' that is rotatably supported by the housing 46'.

The two-speed range unit 198 can include a planetary gear set 200 and a range shift device 202. The planetary gear set 200 can include a ring gear 206 non-rotatably fixed to the housing 46', a sun gear 208, a plurality of planet gears 210 meshed with both the ring gear 206 and the sun gear 208, and a planet carrier 212 from which the planet gears 210 are rotatably supported. The planet carrier 212 is fixed to, or integrally formed with, the first differential case 38' of the first differential 30' for common rotation therewith.

The range shift device 202 can include a sun gear shaft 220 surrounding a portion of the first axle shaft 34L' and which is fixed for rotation with the sun gear 208, a carrier shaft 222 surrounding a portion of the sun gear shaft 220 and which is fixed for rotation with the planet carrier 212, and a tubular range sleeve 224 surrounding portions of the carrier shaft 222, the sun gear shaft 220 and the input shaft 204. The input shaft 204 can have a first end 226 adapted for connection via a splined coupling shaft 227 (FIG. 12) to the output of transmission 26' and a second end having a set of elongated external spline teeth 228 formed thereon. The range sleeve 224 can include a set of internal spline teeth 230 that are in continuous meshed engagement with the external spline teeth 228 on the input shaft 204. As such, the range sleeve 224 is coupled for common rotation with the input shaft 204 while being capable of bi-directional axial sliding movement thereon between a plurality of predefined range position which will be discussed hereinafter in greater detail. The range sleeve 224 further defines a set of internal clutch teeth 232 that can be moved into and out of engagement with a set of external clutch teeth 234 formed on the carrier shaft 222 or a set of external clutch teeth 236 formed on the sun gear shaft 220.

The disconnect mechanism 54' is generally similar in function to the disconnect mechanism 54 in that it is configured to selectively connect the input shaft 204 to the transfer gear assembly 52' for transmitting rotary power from the input shaft 204 to the output pinion shaft 60' when the all-wheel drive mode is desired. However, the disconnect mechanism 54' differs in that the drive connection between the input shaft 204 and the transfer shaft 64' is made indirectly via the range sleeve 224. In particular, the range sleeve 224 can include first and second sets of external spline teeth 240 and 242, respectively, which are selectably engageable with internal spline teeth 244 formed on a mode collar 246. As such, the mode collar 246 is coupled for rotation with the range sleeve 224 and is capable of bi-directional axial translation relative to the range sleeve 224 between a first (2WD) mode position and a second (AWD) mode position.

With the mode collar 246 in its first mode position, a set of internal clutch teeth 248 formed on the mode collar 246 are released from meshed engagement with the external clutch teeth 78' on the transfer shaft 64', whereby no rotary power is transmitted from the input shaft 204 through the transfer gear assembly 52' to the output pinion shaft 60'. In contrast, with the mode collar 246 in its second mode position, its internal spline teeth 244 are engaged with one of the first and second sets of external splines 240 and 242 (depending on the axial position of the range sleeve 224) and its internal clutch teeth 248 are engaged with the clutch teeth 78' on the transfer shaft 64', thereby establishing a drive connection between the input shaft 204 and the output pinion shaft 60'.

The two-speed range unit 198 is operable to establish at least two different speed ratio drive connections between the input shaft 204 and the first differential 30'. Specifically, the range sleeve 224 can be axially translated between a plurality of predefined range positions. In a first or "high" (Hi) range position, the range sleeve 224 is located such that its internal clutch teeth 232 are engaged with the external clutch teeth 234 on the carrier shaft 222. Since the internal splines 230 on the range sleeve 224 remain in constant meshed engagement with the external spline teeth 228 on the input shaft 204, location of the range sleeve 224 in its high-range position results in establishing a first or direct ratio drive connection between the input shaft 204 and the carrier shaft 222 which, in turn, is connected via the carrier 212 to the first differential case 38'. As such, a one-to-one or direct drive connection is established between the input shaft 204 and the first differential 30'.

In a second or "neutral" range position, the range sleeve 224 is disconnected from driven connection with both of the carrier shaft 222 and the sun gear shaft 220 such that the input shaft 204 is disconnect from the first differential 30'.

In a third or "low" (Low) range position, the range sleeve 224 is located such that its internal clutch teeth 232 are engaged with the external clutch teeth 236 formed on the sun gear shaft 220. With the range sleeve 224 located in its low-range position, a second or reduced-ratio drive connection is established between the input shaft 204 and the first differential 30'. Specifically, driven rotation of the sun gear shaft 220 causes the planetary gear set 200 to drive the carrier 212 at a reduced speed relative to the input shaft 204 such that the primary driveline 16' is likewise driven at the reduced speed ratio via the first differential 30'.

With continued reference to FIG. 11, the disconnect actuator 56' is shown positioned adjacent to the housing 46' and can include a first shift fork 84' engaging the mode collar 246, a second shift fork 250 engaging the range sleeve 224, and a power-operated unit 252 configured to receive control signals from the controller 150 and operable to coordinate movement of the shift forks 84' and 250. The power-operated unit 252 can be any type of unit capable of selectively translating the first shift fork 84' for causing movement of the mode collar 246 between its two mode positions while also selectively translating the second shift fork 250 for causing movement of the range sleeve 224 between its three range positions.

Figure 12:
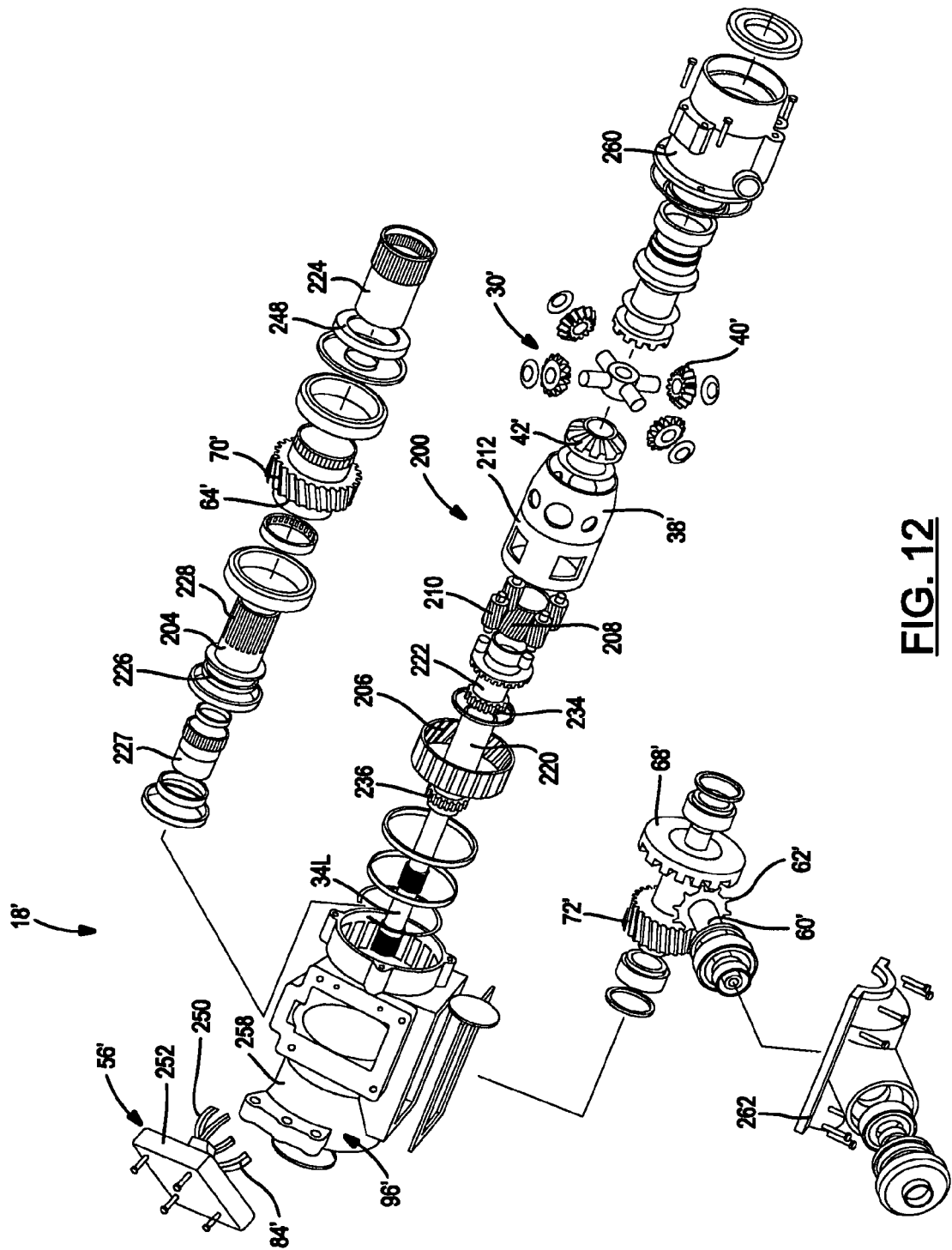
FIG. 12 is an exploded perspective view of a two-speed power take-off unit based on the schematic shown in FIG. 11 and which is constructed in accordance with the present teachings.
Figure 13:
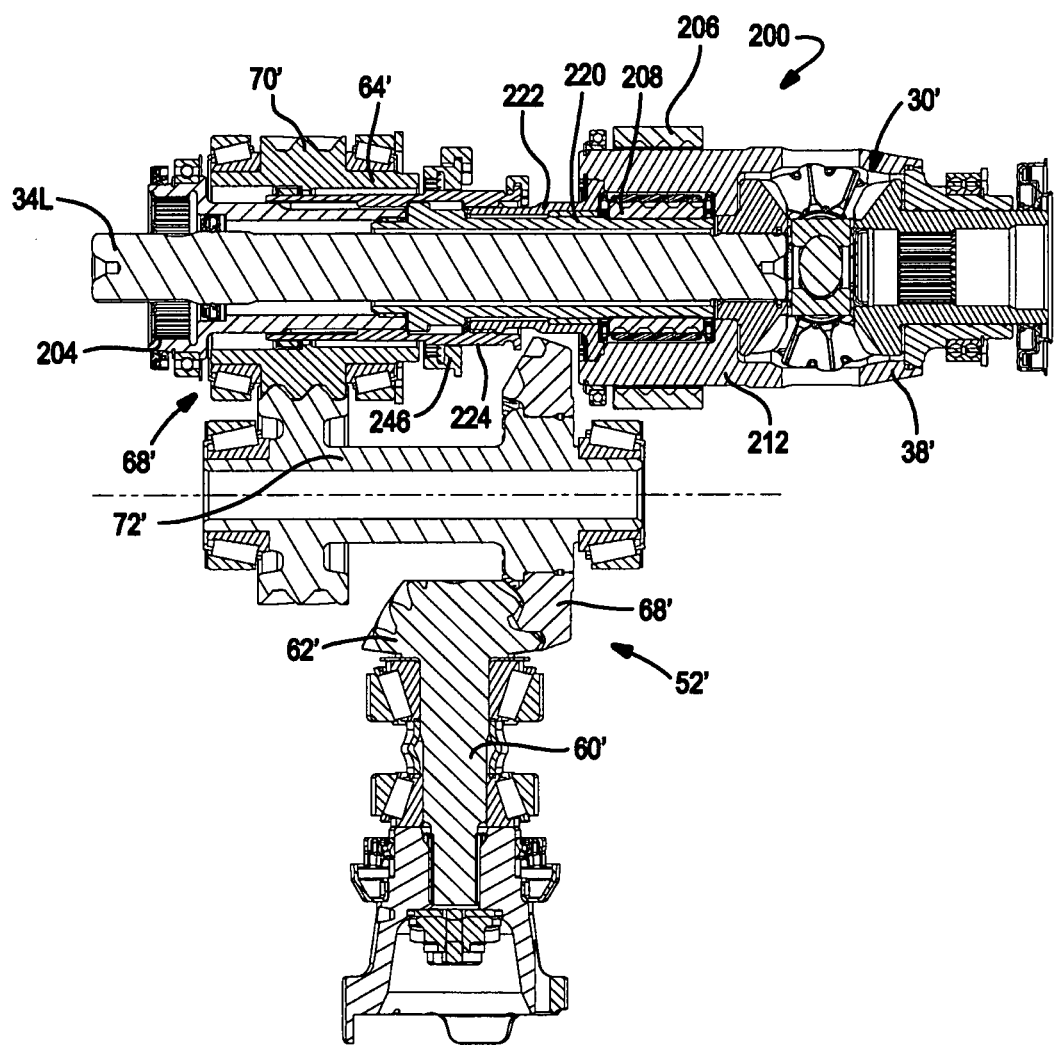
FIG. 13 is a sectional view of the two-speed power take-off unit shown in FIG. 11.

With reference now to FIGS. 12 and 13, a more definitive structural configuration of the components associated with the two-speed power take-off unit 18' is shown. In particular, FIG. 12 illustrates an exploded perspective view of an exemplary embodiment of the two-speed power take-off unit 18'. Housing 46' is shown to include a multi-piece assembly having a main housing 258 to which a differential housing 260 and a PTU housing 262 are secured. FIG. 13 is a sectional view which illustrates the compact arrangement of the planetary gear set 200, the range shift device 202, the transfer gear assembly 52', and the moveable mode collar 246 and range sleeve 224.

As will be understood, the bi-directional translational movement of the range sleeve 224 and the mode collar 246 can be coordinated to establish a plurality of range and mode combinations for the two-speed power take-off unit 18' based on control signals from the controller 150. Referring to FIGS. 14A through 14D, these various range and mode combinations can be more clearly illustrated.

Figure 14A:
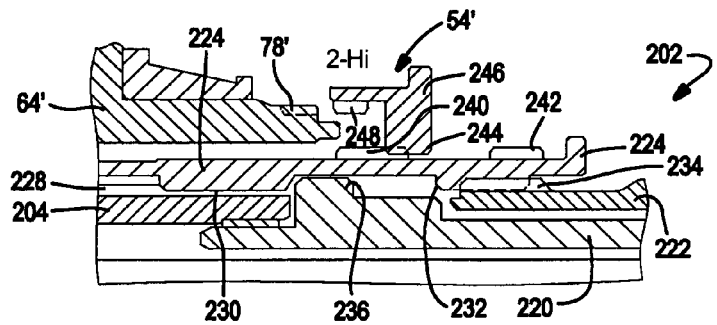
FIGS. 14A through 14D are partial sectional views of the two-speed power take-off unit shown in FIG. 13 with its mode and range shift components positioned to define a two-wheel high-range (2-Hi) mode, a four-wheel high-range (4-Hi) mode, a neutral mode, and a four-wheel low-range (4-Low) mode, respectively.

FIG. 14A shows the positions of the range sleeve 224 and the mode collar 246 for establishing a two-wheel high-range (2-Hi) mode for the power take-off unit 18'. Specifically, the mode collar 246 is shown located in its first mode position while the range sleeve 224 is shown located in its first range position. As such, the input shaft 204 is coupled via the range sleeve 224 to the carrier shaft 222 for establishing the direct drive connection between the powertrain 12 and the primary driveline 16'. Concurrently, the transfer shaft 64' is disconnected from driven connection with the input shaft 204, thereby disconnecting the secondary driveline 20' from the powertrain 12. Thus, rotary power is only transmitted by the powertrain 12 to the primary driveline 16' without speed reduction.

Figure 14B:
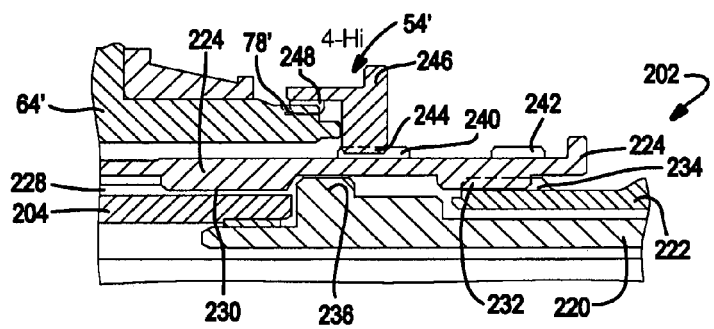

FIG. 14B shows the positions of the range sleeve 224 and the mode collar 246 for establishing a four-wheel high-range (4-Hi) mode for the power take-off unit 18'. Specifically, the high-range connection is maintained by the range sleeve 224 remaining in its first range position while the mode collar 246 is shown moved into its second mode position. Thus, the mode collar 246 establishes a drive connection from the input shaft 204 (through the range sleeve 224) to the transfer shaft 64' for also transmitting rotary power from the powertrain 12 to the secondary driveline 20'.

Figure 14C:
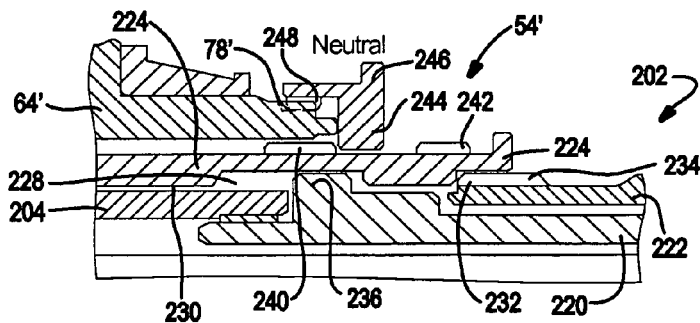

FIG. 14C shows the positions of the range sleeve 224 and the mode collar 246 for establishing a Neutral non-driven mode for the power take-off unit 18'. As seen, the mode collar 246 is maintained in its second mode position while the range sleeve 224 has been axially moved into its second range position such that its internal splines 232 are disengaged from the external clutch teeth 234 on the carrier shaft 220 and the external clutch teeth 236 on the sun gear shaft 220. Thus, the input shaft 204 is disconnected from both inputs to the primary driveline 16' such that no rotary power is transmitted from the powertrain 12 to the primary driveline 16'. It will also be noted that such movement of the range sleeve 224 to its second range position causes the internal spline teeth 244 on the mode collar 246 to disengage the first set of external splines 240 on the range sleeve 224 while the mode collar 246 maintains its connection with the transfer shaft 64'.

Figure 14D:
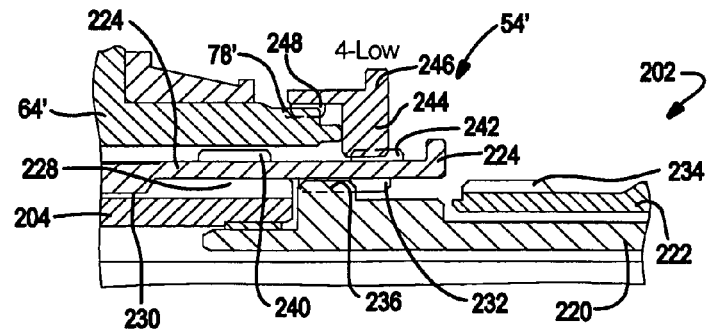
Figure 15:
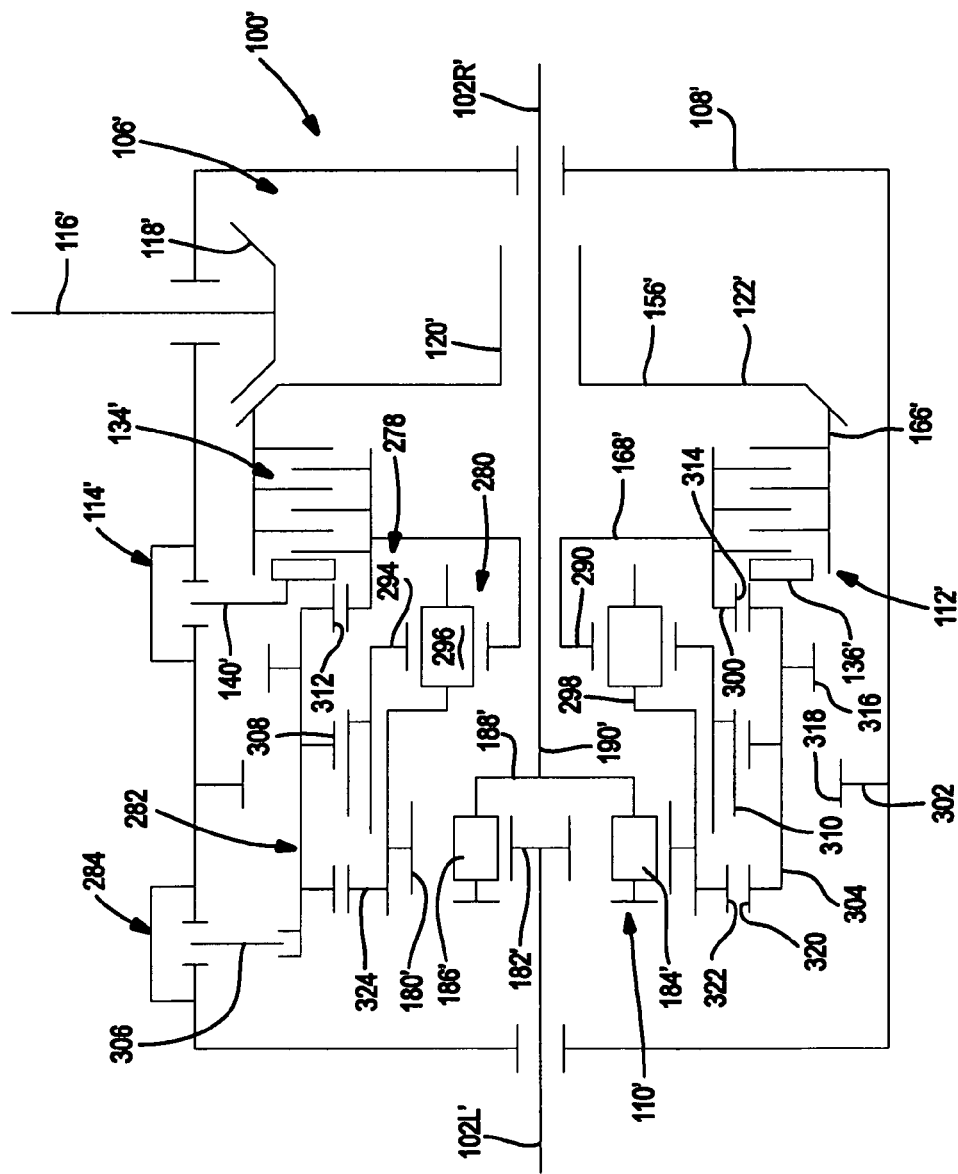
FIG. 15 is a schematic illustration of a two-speed rear drive module associated with the disconnectable all-wheel drive system of FIG. 10.

FIG. 14D shows the position of the mode collar 246 and the range sleeve 224 for establishing a four-wheel low-range (4-Low) mode for the power take-off unit 18'. Specifically, the mode collar 246 is maintained in its second mode position while the range sleeve 224 is moved axially into its third range position. As such, the low-range drive connection is established by the range sleeve 224 between the input shaft 204 and the sun gear shaft 220 while the AWD connection is established by the mode collar 246. It will be noted that the internal spline teeth 244 of the mode collar 246 engage the second set of external spline teeth 242 upon movement of the range sleeve 224 from its neutral range position into its low range position. While it is possible to provide the external splines 240 and 242 on the range sleeve 224 in a continuous arrangement, the non-toothed separation space therebetween has been recognized to inhibit potential tooth blocking conditions upon movement of the range sleeve 224 between its high-range and low-range positions.

With particular reference now to FIGS. 12, 15 and 16A through 16C, the secondary driveline 16' can include the propshaft 86, a two-speed rear drive module 100', a pair of second axle shafts 102L' and 102R', and a set of second vehicle wheels 104L and 104R. A first end of the propshaft 86 is coupled to the output pinion shaft 60' extending from the two-speed power take-off unit 18' while a second end of the propshaft 86 is coupled for rotation with an input assembly 106' of the two-speed rear drive module 100'. The rear drive module 100' can include a housing 108', a second differential 110', a torque transfer device 112', a TTD actuator 114' for controlling actuation of the torque transfer device 112', a two-speed range unit 278 having a planetary gear assembly 280 and a range shift mechanism 282, and a range actuator 284.

The input assembly 106' can include an input pinion shaft 116' having a pinion gear 118', a hollow spool 120', and a hypoid gear 122' fixed to a flange portion 156' of the spool 120' and which is meshed with the pinion gear 118'. The second differential 110' is an epicyclic arrangement which can include an annulus gear 180', sun gear 182', a set of first planet gears 184' meshed with the annulus gear 180', a set of second planet gears 186' meshed with the sun gear 182', and a carrier unit 188 from which the first planet gears 184' and the second planet gears 186' are rotatably supported. The planet gears are circumferentially arranged such that each one of the first planet gears 184' also meshes with at least one of the second planet gears 186'. The carrier unit 188' can include a tubular boss 190' that is configured to be connected via a splined connection 192' to the second axle shaft 102R' while the sun gear 182' can be connected via a splined connection 194' to the second axle shaft 102L'.

Torque transfer device 112' can include an input clutch member 130' fixed for rotation with the hypoid gear 122, an output clutch member 132', and a multi-plate clutch pack 134' operably disposed therebetween. A clutch drum 166' can be integrated with the hypoid gear 122' and act as the input clutch member 130' while a clutch hub 168' can act as the output clutch member 132'. The clutch pack 134' is operably disposed between the clutch drum 166' and the clutch hub 168'. The torque transfer device 112' can also include an engagement mechanism 136' that is moveable under the control of the TTD actuator 114' based on control signals from the controller 150 to selectively apply a clutch engagement force to the clutch pack 134'. Thus, rotary power transferred from the input assembly 106' through the torque transfer device 112' is transmitted to the clutch hub 168'. The engagement mechanism 136' can include an apply piston 170' disposed for sliding movement in a pressure chamber 172' which can be supplied with pressurized fluid by a hydraulically-operated unit associated with the TTD actuator 114'. The engagement mechanism 136' can further include a plurality of circumferentially aligned load pins 266 each having a first end engaging the apply piston 170' and a second end engaging an apply plate 268. The apply plate 268 is configured to apply the clutch engagement force on the clutch pack 134'.

The TTD actuator 114' can be any power-operated device capable of shifting the torque transfer device 112' between a first or "disconnected" mode and a second or "connected" mode. The first mode can be established when the engagement mechanism 136' is positioned such that rotary power is not transmitted from the input clutch member 130' to the output clutch member 132'. The second mode for the torque transfer device 112' can be established when the clutch engagement force exerted by the engagement mechanism 136' causes rotary power to be transmitted through the clutch pack 134' to the output clutch member 132'. The TTD actuator 114' can be generally similar to TTD actuator 114 and leadline 140' is used to designate the mechanical or hydraulic connection between the TTD actuator 114' and the engagement mechanism 136'.

The two-speed range unit 278 is operable to establish at least two different speed ratio drive connections between the output clutch member 132' of the torque transfer device 112' and the second differential 110'. Specifically, the planetary gear assembly 280 can include a sun gear 290 fixed for rotation via a splined connection 292 with the clutch hub 168', a ring gear 294, a plurality of planet gears 296 meshed with the sun gear 290 and the ring gear 294, and a planet carrier 298 from which the planet gears 296 are rotatably supported. The planet carrier 298 can be fixed for common rotation with the annulus gear 180' of the second differential 110'.

The range shift mechanism 282 can include a first or direct clutch ring 300 fixed for rotation with the clutch hub 168', a second or low clutch ring 302 non-rotatably fixed to the housing 108', a range collar 304, and a range fork 306. The load pins 266 are shown in FIG. 16 to extend through a plurality of support bores formed through the second clutch ring 302. The range collar 304 can include a set of internal spline teeth 308 that is in continuous meshed engagement with a set of external spline teeth 310 formed on the ring gear 294 of the planetary gear assembly 280. As such, the range collar 304 is coupled for common rotation with the ring gear 294 while being capable of bi-directional axial sliding movement thereon. The range collar 304 can further include a set of first clutch teeth 312 that can be moved into and out of engagement with a set of clutch teeth 314 formed on the first clutch ring 300, a set of second clutch teeth 316 that can be moved into and out of engagement with a set of clutch teeth 318 formed on the second clutch ring 302, and a set of third clutch teeth 320 that can be moved into and out of engagement with a set of clutch teeth 322 formed on a third clutch ring 324 that is fixed for rotation with the annulus gear 180'. As will be detailed, translational movement of the range collar 304 is operable to establish at least two different speed range drive connections between the clutch hub 168' of the torque transfer device 112' and the annulus gear 180' of the second differential 110'.

Figure 16A:
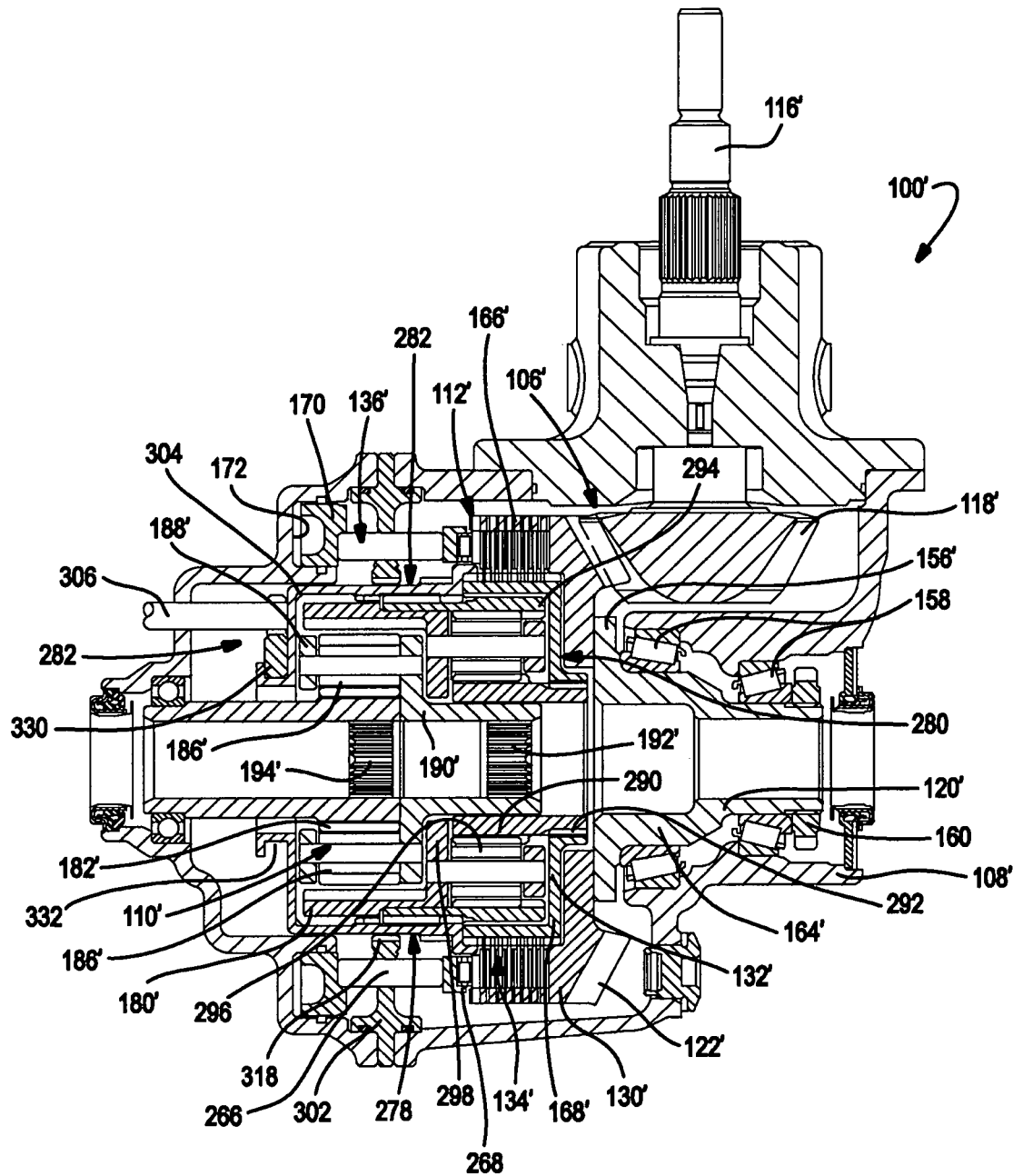
FIGS. 16A through 16C are sectional views of a two-speed rear drive module based on the schematic shown in FIG. 15 with its range shift components positioned to define a high-range (H) mode, a neutral (N) mode, and a low-range (L) mode.

The range collar 304 is shown in FIG. 16A positioned in a first or high range position such that its first clutch teeth 312 are meshed with the clutch teeth 314 on the first clutch ring 300 and its third clutch teeth 320 are meshed with the clutch teeth 322 on the annulus gear 180'. In addition, the second clutch teeth 316 on the range collar 304 are disengaged from engagement with the clutch teeth 318 on the second clutch ring 302. With the range collar 304 located in its first range position, the range collar 304 directly couples the clutch hub 168' to the annulus gear 180'. In addition, the sun gear 290 and the ring gear 294 are coupled together by the range collar 304 in its first range position such that the planetary gear assembly 280 is locked against relative rotation and rotates as a unit. Thus, the range collar 304 establishes a first or direct ratio drive connection between the output component (the output clutch member 132') of the torque transfer device 112' and the input component (the annulus gear 180') of the second differential 110' when located in its first range position.

Figure 16B:
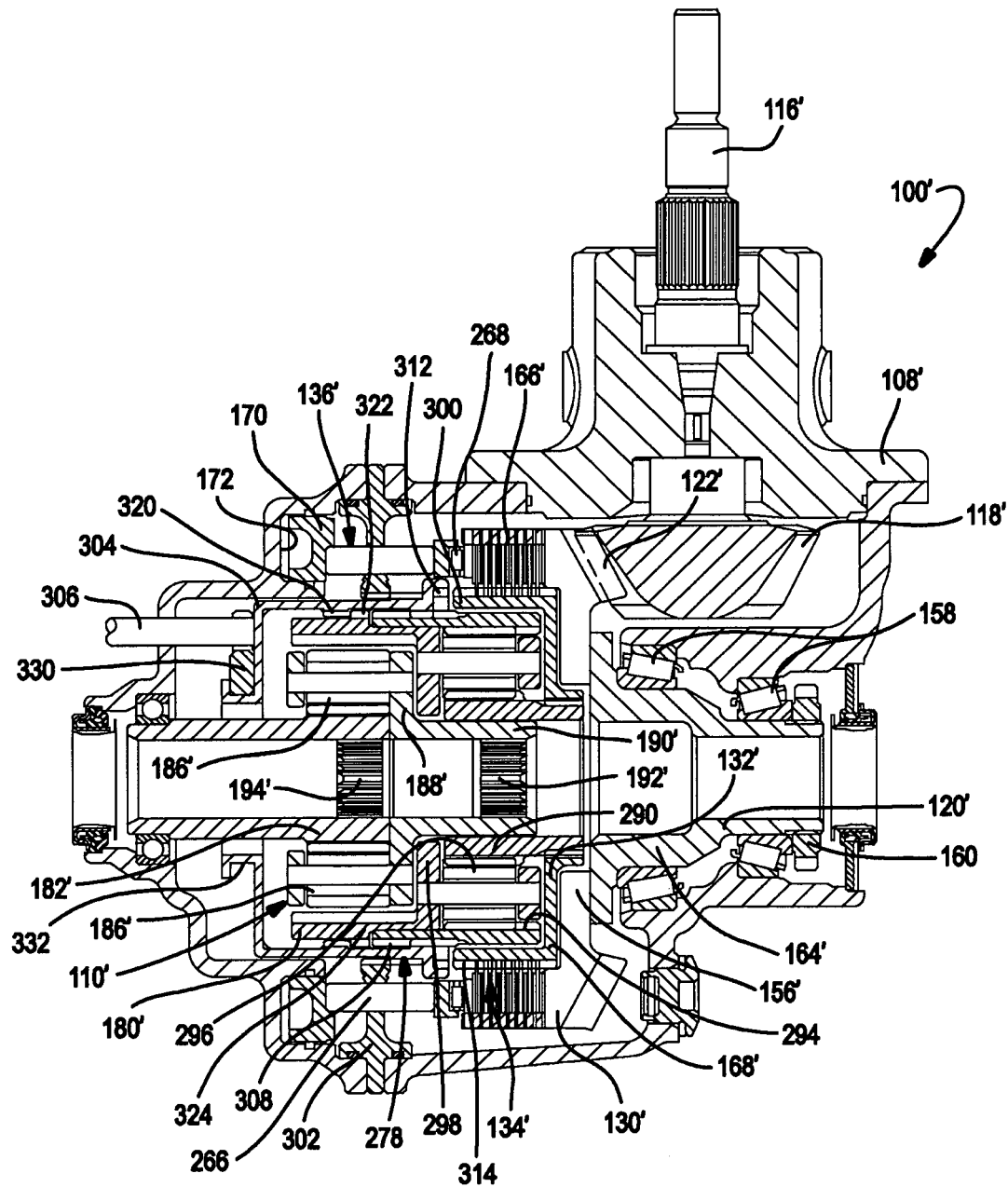

The range collar 304 is shown in FIG. 16B positioned in a second or neutral range position such that its first clutch teeth 312 are disengaged from the clutch teeth 314 on the first clutch ring 300, its second clutch teeth 316 are disengaged from the clutch teeth 318 on the second clutch ring 302, and its third clutch teeth 320 are disengaged from the clutch teeth 322 on the third clutch ring 324. As such, the output clutch member 132' of the torque transfer device 112' is released from driven engagement with the annulus gear 180' of the second differential 110'.

Figure 16C:
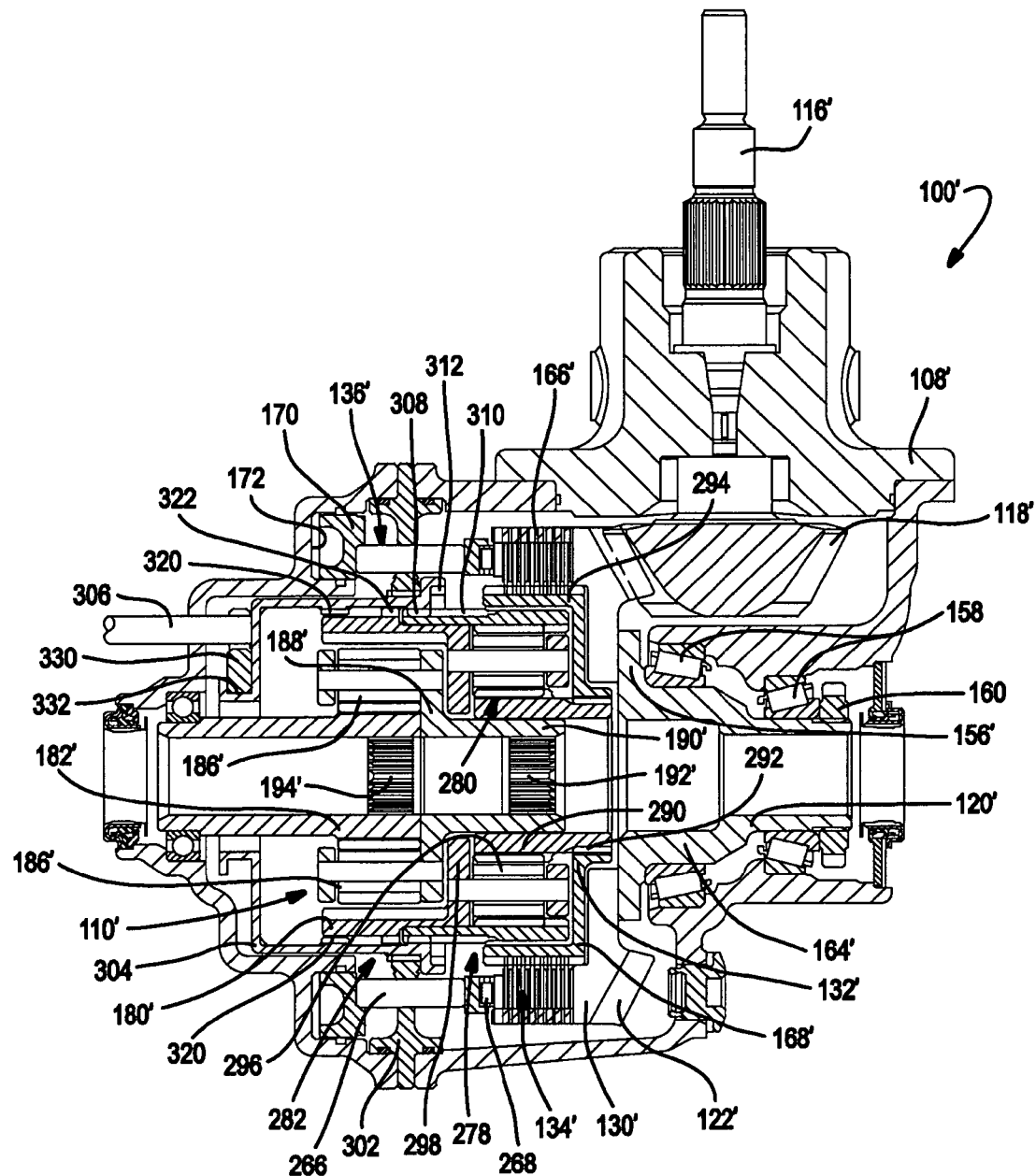

The range collar 304 is shown in FIG. 16C positioned in a third or low range position such that its first clutch teeth 312 are disengaged from the clutch teeth 314 on the first clutch ring 300, its second clutch teeth 316 are meshed with the clutch teeth 318 on the second clutch ring 302, and its third clutch teeth 320 are disengaged from the clutch teeth 322 on the third clutch ring 324. As such, the ring gear 294 is braked against rotation and driven rotation of the sun gear 290 (via the output clutch member 132' of the torque transfer device 112') causes the planet carrier 298 to drive the annulus gear 180' at a reduced speed relative to the sun gear 290, thereby establishing a second or reduced ratio drive connection between the output clutch member 132' of the torque transfer device 112' and the annulus gear 180' of the second differential 110'.

The range actuator 284 can be any type of power-operated mechanism that is operable to control axial translational movement of the range fork 306 which, in turn, causes movement of the range collar 304 between its three distinct range positions. The range actuator 284 is shown schematically to be mounted to the housing 108' of the two-speed rear drive module 100'. The range actuator 284 can be a motor-driven geared device configured to receive control signals from the controller 150 and convert rotation of the motor output into translational movement of the range fork 306. The range fork 306 is shown in FIGS. 16A-16C to extend through an opening in the housing 108' and includes a projection 330 that extends into an annular grove 332 formed in the range collar 304.

In operation, the vehicle 10' can normally be operated in a two-wheel high-range drive mode in which the power take-off unit 18' establishes a high-range drive connection between the powertrain 12 and the primary driveline 16' while the rear drive module 100' is disengaged. Specifically, the range sleeve 224 and the mode collar 246 respectively associated with the range shift mechanism 202 and the disconnect mechanism 54' are located as shown in FIG. 14A to establish the 2-Hi mode. With the mode collar 246 in its first mode position, the input shaft 204 is disconnected from the transfer shaft 64' such that substantially all rotary power is transferred from the powertrain 12 to the primary driveline 16'. The torque transfer device 112' is maintained in its first mode to disconnect the secondary driveline 20'. While the torque transfer device 112' is operating in its first mode, the range collar 304 can be located in its high-range position (FIG. 16A).

When it is desired or necessary to operate the motor vehicle 10' in an all-wheel high-range (AWD-H) drive mode, the control system 22 can be activated to initially signal the TTD actuator 114' to shift the torque transfer device 112' into its second mode for synchronizing the speeds of the primary driveline 16' and the secondary driveline 20'. Upon synchronization, the controller 150 signals the disconnect actuator 56' to shift the mode collar 246 to its second mode position while maintaining the range sleeve 224 in its first range position (FIG. 14B). This establishes a four-wheel high-range drive connection between the powertrain 12, the primary driveline 16' and the input 106' to the rear drive module 100'. In addition, the range actuator 284 can be actuated to maintain or move the range collar 304 into its high-range position (FIG. 16A) such that the rotary power delivered through the torque transfer device 112' is transmitted to the second differential 110' at the direct speed ratio. Thereafter, the TTD actuator 114' can be controlled to vary the torque transmitted through the torque transfer device 112' to the second vehicle wheels 104L,104R.

If during operation of the vehicle 10' in its AWD-H drive mode, it is desired or determined that improved traction requires operation in an all-wheel drive low-range (AWD-L) drive mode, the control system 22 functions to coordinate shifting of the power take-off unit 18' into its four-wheel low-range mode and the rear drive module 100' into its low-range mode. Specifically, the positions of the mode collar 246 and the range sleeve 224 of the power take-off unit 18' to establish this connection are shown in FIG. 14D while the position of the range collar 304 of the rear drive module 100' to establish this connection is shown in FIG. 16C. Thus, the low-range drive connections are established in the power take-off unit 18' and the rear drive module 100'. These low-range drive connections can be established sequentially or concurrently based on a suitable control method and can be established with the vehicle 10' in a stationary or non-motive state.

Finally, a towing mode for the vehicle 10' can be established by shifting the power take-off unit 18' into its neutral mode (FIG. 14C) and the rear drive module 100' into its neutral mode (FIG. 16B).

Figure 17:
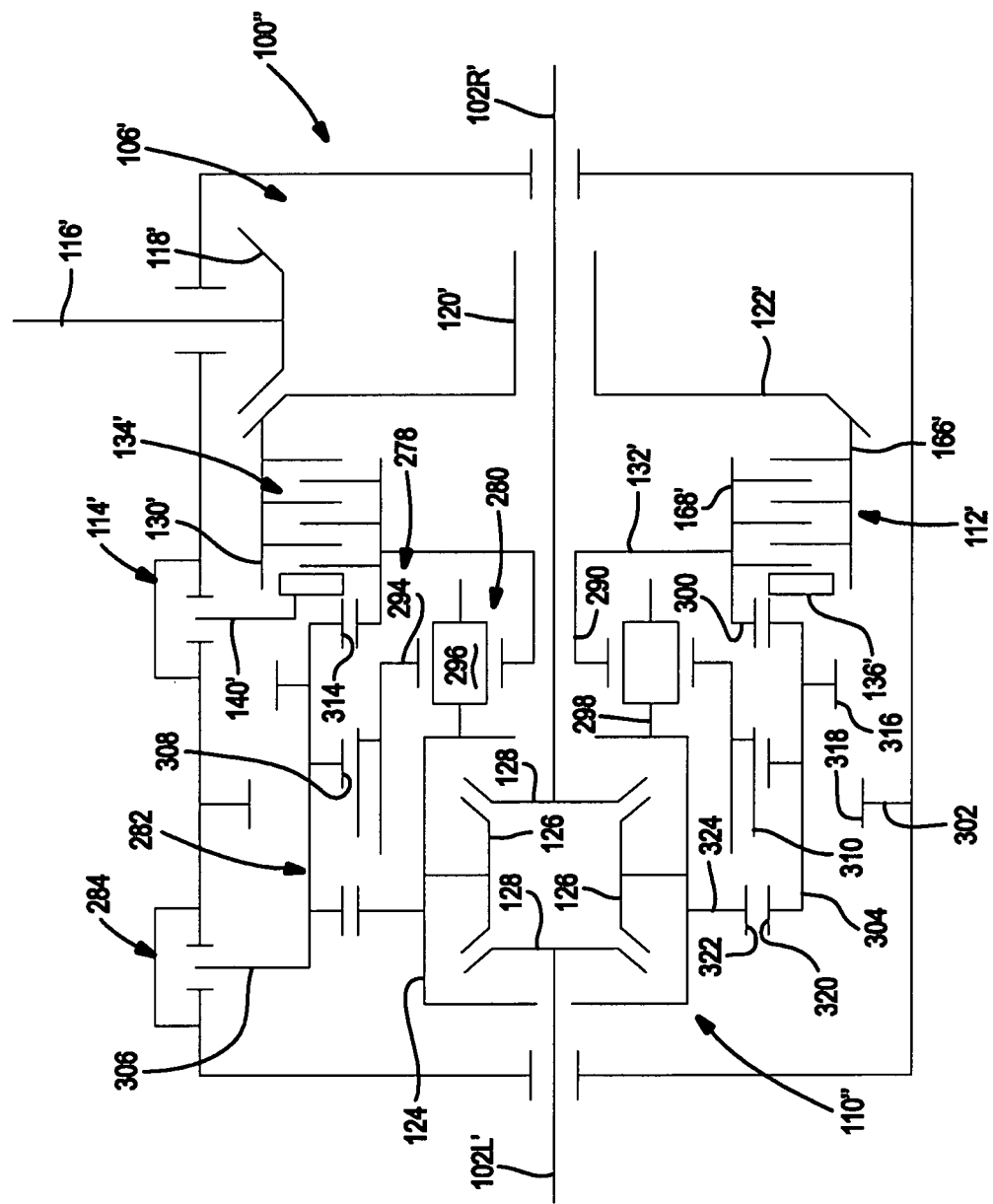
FIG. 17 is a schematic of another two-speed rear drive module associated with the disconnectable all-wheel drive system of FIG. 10.

Referring now to FIG. 17, a schematic view of an alternative exemplary embodiment of a two-speed rear drive module 100" is shown which can be associated with the vehicle 10' shown in FIG. 10. In essence, the two-speed rear drive module 100" is generally similar to the two-speed rear drive module 100' shown in FIGS. 15 and 16 with the exception that a bevel-type second differential 110" is substituted for the epicyclical second differential 110'. Thus, the two-speed range unit 278 is now operable to selectively establish drive connections between the output clutch member 132' of the torque transfer device 112' and the second differential case 124' of the second differential 110". Specifically, movement of the range collar 304 between its three range positions is operable to establish the direct ratio, neutral and reduced-ratio drive connections between the output component of the torque transfer device 112' and the input component to the second differential 110".

The present disclosure relates generally to single-speed and two-speed disconnectable drivelines for use in all-wheel drive vehicles. To this end, it is desirable to provide power take-off units and rear drive modules that are configured to provide a compact arrangement for modular assembly. The single-speed rear drive modules 100 and 100A of FIGS. 8 and 9, respectively, illustrates these desirable features in that the second differentials 110, 110A are shown installed in a cantilevered manner relative to the bell-shaped spool 120 and the meshed hypoid gear 122 and pinion gear 118. The concentric location of the torque transfer devices 112, 112A relative to the second differentials 110, 110A provides a compact axial arrangement. In addition, the bevel-type differential 110 can be substituted for the epicyclic differential 110A with only minor changes made to the housing 108 to permit product modularity. The two-speed rear drive modules 100' and 100" also show these desirable features and provide for a compact arrangement of the two-speed reduction units between the torque transfer devices and the second differentials.

While specific aspects have been described in the specification and illustrated in the drawings, it will be understood by those skilled in the art that various changes can be made and equivalents can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration, or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples following within the foregoing description and the appended claims.

What is claimed is:

1. A drivetrain for an all-wheel drive motor vehicle, the drivetrain comprising:

a primary driveline including a first differential, said primary driveline being adapted for driving a pair of first vehicle wheels, said first differential having a first differential case;

a power switching mechanism having an input shaft adapted to receive rotary power from a powertrain, a first two-speed range unit disposed between said input shaft and said first differential that is operable in a first range mode to couple said input shaft and said first differential case for common rotation and in a second range mode to establish a reduced speed ratio drive connection between said input shaft and said first differential case, an output pinion shaft, and a disconnect mechanism operable in a connected mode to permit transmission of rotary power between said input shaft and said output pinion shaft and in a disconnected mode to inhibit transmission of rotary power between said input shaft and said output pinion shaft; and a second driveline including a propshaft and a rear drive module, said rear drive module including a second differential, an input pinion shaft driving a hypoid gear, a torque transfer device, and a second two-speed range unit, said second differential having an input member and a pair of output members adapted to drive a pair of second vehicle wheels, said input pinion shaft being coupled by said propshaft to said output pinion shaft of said power switching mechanism, said second two-speed range unit including a planetary gear assembly and a range shift mechanism, said torque transfer device configured to surround said planetary gear assembly and includes a clutch input member driven by said hypoid gear, a clutch output member driving said planetary gear assembly, and a clutch pack operably disposed between said input clutch member and said output clutch member, said torque transfer device being operable in a first mode to permit transmission of rotary power from said clutch input member to said clutch output member and in a second mode to inhibit transmission of rotary power from said clutch input member to said clutch output member, said range shift mechanism being operable in a first range mode to establish a first speed ratio drive connection between said clutch output member and said input member of said second differential and in a second range mode to establish a second speed ratio drive connection between said planetary gear assembly and said input member of said second differential.

2. The drivetrain of claim 1 wherein said power switching mechanism is a power take-off unit including a transfer gear assembly driving said output pinion shaft, wherein said first two-speed range unit includes a planetary gear set and a range sleeve, wherein said planetary gear set includes a non-rotary ring gear, a sun gear, a plurality of planet gears meshed with said ring gear and said sun gear, and a planet carrier rotatably supporting said planet gears and which is fixed for rotation with said first differential case, wherein said range sleeve is coupled for common rotation with said input shaft and is axially moveable between a first range position in which said range sleeve interconnects said input shaft to said planet carrier and a second range position that interconnects said input shaft to said sun gear.

3. The drivetrain of claim 2 wherein said disconnect mechanism includes a mode collar coupled to said range sleeve for common rotation and sliding movement between a first mode position and a second mode position, wherein said mode collar connects said transfer gear assembly to said range sleeve when positioned in its first mode position, and wherein said mode collar is disengaged from said transfer gear assembly when said mode collar is positioned in its second mode position.

4. The drivetrain of claim 3 wherein said range sleeve surrounds a portion of said input shaft and is axially moveable thereon between its first and second range positions, wherein said transfer gear assembly includes a transfer shaft surrounding a portion of said input shaft and said range sleeve, and wherein said mode collar surrounds a portion of said range sleeve and is axially moveable thereon between its first mode position and its second mode position.

5. The drivetrain of claim 1 wherein said planetary gear assembly includes a sun gear fixed for rotation with said clutch output member, a ring gear, a planet carrier fixed for rotation with said input member of said second differential, and planet gears rotatably supported by said planet carrier and which are meshed with said sun gear and said ring gear, and wherein said range shift mechanism includes a range collar that is axially moveable between first and second range positions for establishing said first and second range modes.

6. The drivetrain of claim 5 wherein said range shift mechanism further includes a first clutch ring fixed for rotation with said clutch output member, a second non-rotatable clutch ring, and a third clutch ring coupled for rotation with said input member of said second differential, wherein said range collar is fixed for rotation with said ring gear and is axially moveable between its first and second range positions.

7. The drivetrain of claim 6 wherein said range collar is operable in its first range position to releasably engage said first clutch ring and said third clutch ring so as to establish a direct connection between said clutch output member and said input member of said second differential, and wherein said range collar is operable in its second range position to releasably engage said second clutch ring so as to hold said ring gear against rotation and cause said planet carrier to be driven at a reduced speed relative to said sun gear.

8. The drivetrain of claim 7 wherein said second differential is a bevel differential assembly having a second differential case as its input member and a pair of output side gears as its output members, wherein said third clutch ring is fixed for rotation with said second differential case, and wherein said second differential case is fixed for rotation with said planet carrier of said planetary gear assembly.

9. The drivetrain of claim 7 wherein said second differential is an epicyclic differential assembly having an annulus gear as its input member, a sun gear as one of its output members, a carrier as its other output member, and first and second planet gears rotatably supported from said carrier, wherein said first planet gear is meshed with said annulus gear and said second planet gear is meshed with said sun gear, and wherein said first planet gear is meshed with said second planet gear.

10. The drivetrain of claim 5 wherein said clutch input member is a clutch drum driven by said hypoid gear and said clutch output member is a clutch hub fixed for rotation with said sun gear, and wherein said clutch hub surrounds said ring gear and said clutch drum surrounds said clutch hub.

11. The drivetrain of claim 5 wherein said power switching mechanism is a power take-off unit including a transfer gear assembly driving said output pinion shaft, wherein said first two-speed range unit includes a planetary gear set and a range sleeve, wherein said planetary gear set includes a non-rotary ring gear, a sun gear, a plurality of planet gears meshed with said ring gear and said sun gear, and a planet carrier rotatably supporting said planet gears and fixed for rotation with said first differential case, wherein said range sleeve is coupled for common rotation with said input shaft and is axially moveable between a first range position in which said range sleeve interconnects said input shaft to said planet carrier and a second range position in which said range sleeve interconnects said input shaft to said sun gear.

12. The drivetrain of claim 11 wherein said disconnect mechanism includes a mode collar coupled to said range sleeve for common rotation and sliding movement between a first mode position and a second mode position, wherein said mode collar connects said transfer gear assembly to said range sleeve when positioned in its first mode position, and wherein said mode collar is disengaged from said transfer gear assembly when said mode collar is positioned in its second mode position.

13. The drivetrain of claim 12 wherein a two-wheel high-range drive mode is established for the motor vehicle when said mode collar is in its second mode position, said range sleeve is in its first range position, and said torque transfer device is in its second mode, whereby substantially all rotary power is transmitted by said primary driveline to said first vehicle wheels and said input pinion shaft of said rear drive module and said propshaft are not back-driven by said second differential.

14. The drivetrain of claim 12 wherein an all-wheel high-range drive mode is established for the motor vehicle when said mode collar is in its first mode position, said range sleeve is in its first range position, said torque transfer device is operating in its first mode, and said range collar is in its first range position.

15. The drivetrain of claim 12 wherein an all-wheel low-range drive mode is established for the motor vehicle when said mode collar is in its first mode position, said range sleeve is in its second range position, said torque transfer device is operating in its first mode, and said range collar is in its second range position.

16. The drivetrain of claim 1 wherein a two-wheel high-range drive mode for the motor vehicle is established when said disconnect mechanism is operable in its disconnect mode, said first two-speed range unit is operable in its first range mode, and said torque transfer device is operable in its second mode, whereby said second differential does not back-drive said input pinion shaft and said propshaft.

17. The drivetrain of claim 1 wherein an all-wheel high-range drive mode for the motor vehicle is established when said disconnect mechanism is operable in its connected mode, said first two-speed range unit is operable in its first range mode, said torque transfer device is operable in its first mode, and said second two-speed range unit is operable in its first range mode.

18. The drivetrain of claim 1 wherein an all-wheel low-range drive mode for the motor vehicle is established when said disconnect mechanism is operable in its connected mode, said first two-speed range unit is operable in its second range mode, said torque transfer device is operable in its first mode, and said second two-speed range unit is operable in its second range mode.

19. A drivetrain for an all-wheel drive motor vehicle, the drivetrain comprising:
- a primary driveline including a first differential, said primary driveline being adapted for driving a pair of first vehicle wheels, said first differential having a first differential case;
- a power switching mechanism having an input shaft adapted to receive rotary power from a powertrain, a first two-speed range unit disposed between said input shaft and said first differential that is operable in a first range mode to couple said input shaft and said first differential case for common rotation and in a second range mode to establish a reduced speed ratio drive connection between said input shaft and said first differential case, an output pinion shaft, and a disconnect mechanism operable in a connected mode to permit transmission of rotary power between said input shaft and said output pinion shaft and in a disconnected mode to inhibit transmission of rotary power between said input shaft and said output pinion shaft; and
- a second driveline including a propshaft and a rear drive module, said rear drive module including a second differential, an input pinion shaft driving a hypoid gear, a torque transfer device, and a second two-speed range unit, said input pinion shaft being coupled by said propshaft to said output pinion shaft of said power switching mechanism, said second differential being adapted to drive a pair of second vehicle wheels and having a second differential case, said second two-speed range unit including a planetary gear assembly and a range shift mechanism, said torque transfer device configured to surround said planetary gear assembly and includes a clutch input member driven by said hypoid gear, a clutch output member driving said planetary gear assembly, and a clutch pack operably disposed between said input clutch member and said output clutch member, said torque transfer device being operable in a first mode to permit transmission of rotary power from said clutch input member to said clutch output member and in a second mode to inhibit transmission of rotary power from said clutch input member to said clutch output member, said range shift mechanism being operable in a first range mode to establish a first speed ratio drive connection between said clutch output member and said second differential case and in a second range mode to establish a second speed ratio drive connection between said planetary gear assembly and said second differential case.

20. The drivetrain of claim 19 wherein said planetary gear assembly includes a sun gear fixed for rotation with said clutch output member, a ring gear, a planet carrier fixed for rotation with said second differential case, and planet gears rotatably supported by said planet carrier and meshed with said sun gear and said ring gear, wherein said range shift mechanism includes a first clutch ring fixed for rotation with said clutch output member, a second non-rotatably clutch ring, a third clutch ring fixed for rotation with said second differential case, and a range collar coupled for rotation with said ring gear and axially moveable between first and second range positions, wherein said range collar is operable in its first range position to establish said first range mode by releasably coupling said first clutch ring to said third clutch ring, and wherein said range collar is operable in its second range position to establish said second range mode by releasably coupling said ring gear to said second clutch ring.

* * * * *